(12) United States Patent
Zhang

(10) Patent No.: US 10,902,583 B2
(45) Date of Patent: Jan. 26, 2021

(54) DUMMY SUBSTRATE DETECTION METHOD, DUMMY SUBSTRATE DETECTOR DEVICE AND SYSTEM

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventor: Jiaqin Zhang, Beijing (CN)

(73) Assignees: BOE TECHNOLOGY GROUP CO., LTD., Beijing (CN); CHONGQING BOE OPTOELECTRONICS TECHNOLOGY CO. LTD., Chongqing (CN)

( * ) Notice: Subject to any disclaimer, the term of this patent is extended or adjusted under 35 U.S.C. 154(b) by 228 days.

(21) Appl. No.: 16/304,027

(22) PCT Filed: Mar. 15, 2018

(86) PCT No.: PCT/CN2018/079085
§ 371 (c)(1),
(2) Date: Nov. 21, 2018

(87) PCT Pub. No.: WO2018/205742
PCT Pub. Date: Nov. 15, 2018

(65) Prior Publication Data
US 2020/0320675 A1    Oct. 8, 2020

(30) Foreign Application Priority Data

May 12, 2017  (CN) .......................... 2017 1 0335385

(51) Int. Cl.
*G06T 7/00*  (2017.01)

(52) U.S. Cl.
CPC .... *G06T 7/001* (2013.01); *G06T 2207/30121* (2013.01)

(58) Field of Classification Search
CPC ......... G06T 7/0004–7/001; G06T 2207/30121
See application file for complete search history.

(56) References Cited

U.S. PATENT DOCUMENTS

2002/0161534 A1* 10/2002 Adler ................. G01N 23/2252
                                                              702/35
2018/0243800 A1*  8/2018 Kumar .................. G06N 20/00
(Continued)

FOREIGN PATENT DOCUMENTS

CN          1378261 A     11/2002
CN        102495069 A      6/2012
(Continued)

OTHER PUBLICATIONS

International Search Report and Written Opinion dated May 30, 2018; PCT/CN2018/079085.
(Continued)

*Primary Examiner* — Justin P. Misleh

(57) ABSTRACT

A dummy substrate detection method includes: acquiring a real-time image of a conveying route when a cut substrate enters the conveying route; matching and comparing the acquired real-time image of the conveying route with a first reference image, and determining whether or not there is a dummy substrate on the conveying route according to a comparison result. The first reference image is an image of the conveying route with no dummy substrate. A dummy substrate detector device and a dummy substrate detector system are further provided.

19 Claims, 8 Drawing Sheets

(56) References Cited

U.S. PATENT DOCUMENTS

2020/0057004 A1* 2/2020 Guillot ............. G01N 21/95607
2020/0124541 A1* 4/2020 Yasue .................. G01N 21/892

FOREIGN PATENT DOCUMENTS

| | | |
|---|---|---|
| CN | 202305836 U | 7/2012 |
| CN | 103824304 A | 5/2014 |
| CN | 103913468 A | 7/2014 |
| CN | 104193159 A | 12/2014 |
| CN | 107067421 A | 8/2017 |
| JP | 2010-271133 A | 12/2010 |

OTHER PUBLICATIONS

The First Chinese Office Action dated Apr. 22, 2019; Appln. No. 201710335385.0.

* cited by examiner

DUMMY SUBSTRATE DETECTION METHOD, DUMMY SUBSTRATE DETECTOR DEVICE AND SYSTEM

The present application claims priority of Chinese Patent Application No. 201710335385.0 filed on May 12, 2017, the disclosure of which is incorporated herein by reference in its entirety as part of the present application.

TECHNICAL FIELD

Embodiments of the present disclosure relate to a dummy substrate detection method, a dummy substrate detector device, and a dummy substrate detector system.

BACKGROUND

In a TFT-LCD industry, in order to divide a mother glass substrate into a plurality of glass panels of a desired size after a cell assembling process, it is necessary to cut the mother glass substrate. During a procedure of cutting the mother glass substrate, a large amount of dummy glass, which are not needed by the glass panels, are generated.

Development of the cutting technology has experienced from a single-side cutting process to a double-side cutting process. For example, the cutting process for a low-generation production line (<G6) or a Q product is performed in a mode of array substrate (TFT substrate) cutting→array substrate (TFT substrate) splitting→color filter substrate (CF substrate) cutting→color filter substrate (CF substrate) splitting→taking out, or in a mode of array substrate (TFT substrate) cutting→color filter substrate (CF substrate) cutting→splitting→taking out. Apparatus for implementing the cutting process may adopt an inline fully-automatically-controlled mode so that the dummy glass is detected by using a vacuum adsorption method, or a semi-auto mode so that the dummy glass is detected and removed manually. For example, as for a high-generation production line (>G6), the mother glass substrate is cut by the double-side (bottom side and top side) cutting process with factors such as cutting efficiency taken into consideration, and the apparatus for implementing the cutting process mainly adopts the fully-automatically-controlled inline mode.

Regardless of which of the above-described cutting apparatus is adopted, as long as the cutting apparatus is operated in the inline fully-automatically-controlled mode, a process of taking out the glass panel is that: the glass panel is taken away by a pickup hand and conveyed to a next procedure by a conveyor, and the remaining dummy glass flows into a waste glass recovery procedure. In order to prevent the dummy glass from entering the downstream procedure along with the glass panel, which causes defects such as scratch of a surface of the glass panel and damage to an edge of the glass panel, presence or absence of the dummy glass for example are detected in two modes below: one is adding a dummy glass detector element to the cutting apparatus, for example, dummy Y and dummy X elements of an MDI apparatus, that is, determining whether or not the edge of the glass panel carries with the dummy glass by combining a stepper motor with a detecting pin and monitoring a torque (torsion) value of the stepper motor; the other is adding an vacuum adsorption element, that is, determining whether or not there is the dummy glass carried by the glass panel according to a vacuum value.

However, in an actual production process, it is found that: any one of the above-described detecting modes may only be able to detect the dummy glass regularly arranged at the edge of the glass panel, but not be able to detect the dummy glass dropped in a path of the conveyer (i.e. a conveying route). In an automatic production mode, a case where the dummy glass is dropped in the conveying route is prone to occur on the way of the glass panel entering the downstream apparatus; in addition, tact time of a single product is very short, so once the case where the dummy glass is dropped in the conveying route and is not found out in time occurs, a scratch defect may be caused to a large number of subsequent glass panels in a very short time, which thus will cause significant loss to a production company.

SUMMARY

According to embodiments of the disclosure, a dummy substrate detection method, a dummy substrate detector device, and a dummy substrate detector system are provided.

According to the embodiments of the disclosure, the dummy substrate detection method is provided. The method comprises: acquiring a real-time image of a conveying route when a cut substrate enters the conveying route; matching and comparing the acquired real-time image of the conveying route with a first reference image, and determining whether or not there is a dummy substrate on the conveying route according to a comparison result; wherein, the first reference image is an image of the conveying route with no dummy substrate.

For example, in the dummy substrate detection method according to the embodiments of the disclosure, the matching and comparing the acquired real-time image of the conveying route with the first reference image, and determining whether or not there is the dummy substrate on the conveying route according to the comparison result, includes:

performing grayscale processing on the first reference image, to generate a pixel grayscale value matrix of the first reference image:

$$G_{xy}^1 = \begin{bmatrix} G^1(1,1) & G^1(1,2) & \ldots & G^1(1,y) \\ G^1(2,1) & G^1(2,2) & \ldots & G^1(2,y) \\ \ldots & \ldots & \ldots & \ldots \\ G^1(x,1) & G^1(x,2) & \ldots & G^1(x,y) \end{bmatrix}$$

where, x and y are respectively a row number and a column number of a pixel in the first reference image; and $G^1(x,y)$ is a grayscale value of the pixel in an x-th row and a y-th column in the first reference image;

defining the acquired real-time image of the conveying route as a first real-time image, and performing grayscale processing on the first real-time image, to generate a pixel grayscale value matrix of the first real-time image:

$$H_{xy}^1 = \begin{bmatrix} H^1(1,1) & H^1(1,2) & \ldots & H^1(1,y) \\ H^1(2,1) & H^1(2,2) & \ldots & H^1(2,y) \\ \ldots & \ldots & \ldots & \ldots \\ H^1(x,1) & H^1(x,2) & \ldots & H^1(x,y) \end{bmatrix}$$

where, x and y are respectively a row number and a column number of a pixel in the first real-time image; and $H^1(x,y)$ is a grayscale value of the pixel in an x-th row and a y-th column in the first real-time image;

intercepting an M*N sub-matrix $G_{MN}$ from the pixel grayscale value matrix of the first reference image, and defining the sub-matrix as a first reference sub-matrix;

obtaining an M*N sub-matrix matching the first reference sub-matrix from the pixel grayscale value matrix of the first real-time image, and defining the sub-matrix as a first real-time sub-matrix; and performing error analysis between the first real-time sub-matrix and the first reference sub-matrix, and determining whether or not there is the dummy substrate on the conveying route according to an error analysis result.

For example, in the dummy substrate detection method according to the embodiments of the disclosure, the obtaining the M*N sub-matrix matching the first reference sub-matrix from the pixel grayscale value matrix of the first real-time image, includes:

setting an M*N sub-matrix $H_{MN}^{m,n}$ intercepted with an m-th row and an n-th column as starting position from the pixel grayscale value matrix of the first real-time image as the M*N sub-matrix matching the first reference sub-matrix $G_{MN}$, where, $1 \leq m+M \leq x$, $1 \leq n+N \leq y$;

defining a first matching function:

$$D_{(m,n)} = \sum_{i=1}^{M} \sum_{j=1}^{N} [H_{MN}^{m,n}(i,j)]^2 - 2\sum_{i=1}^{M} \sum_{j=1}^{N} [H_{MN}^{m,n}(i,j) \cdot G_{MN}(i,j)] + \sum_{i=1}^{M} \sum_{j=1}^{N} [G_{MN}(i,j)]^2$$

where, $H_{MN}^{m,n}(i,j)$ is an element of an i-th row and a j-th column in the matrix $H_{MN}^{m,n}$, and $G_{MN}(i,j)$ is an element of an i-th row and a j-th column in the matrix $G_{MN}$;

defining a first correlation function:

$$R_{(m,n)} = \frac{\sum_{i=1}^{M} \sum_{j=1}^{N} [H_{MN}^{m,n}(i,j) \cdot G_{MN}(i,j)]}{\sum_{i=1}^{M} \sum_{j=1}^{N} [H_{MN}^{m,n}(i,j)]^2};$$

calculating numerical values of m and n when the first correlation function $R_{(m,n)}$ is closest to 1, and obtaining the M*N sub-matrix $H_{MN}^{m,n}$ matching the first reference sub-matrix according to the numerical values of m and n.

For example, in the dummy substrate detection method according to the embodiments of the disclosure, the performing error analysis between the first real-time sub-matrix and the first reference sub-matrix, and determining whether or not there is the dummy substrate on the conveying route according to the error analysis result, includes:

defining a first single pixel absolute error:

$\varepsilon^1(i,j) = |\{H_{MN}^{m,n}(i,j) - \overline{H}\} - \{G_{MN}(i,j) - \overline{G}\}|$ where, $$\overline{H} = \frac{1}{M \cdot N} \sum_{i=1}^{M} \sum_{j=1}^{N} H_{MN}^{m,n}(i,j), \quad \overline{G} = \frac{1}{M \cdot N} \sum_{i=1}^{M} \sum_{j=1}^{N} G_{MN}(i,j);$$

defining a first objective function, $$E_1 = \sum_{i=1}^{M} \sum_{j=1}^{N} \varepsilon^1(i,j);$$

setting a first objective function threshold $K^1$, and comparing the first objective function with the first objective function threshold $K^1$;

determining that there is the dummy substrate on the conveying route, if the first objective function is greater than the first objective function threshold $K^1$;

determining that there is no dummy substrate on the conveying route, if the first objective function is not greater than the first objective function threshold $K^1$.

For example, the dummy substrate detection method according to the embodiments of the disclosure further comprises: acquiring a real-time image during a process of the cut substrate passing through the conveying route; matching and comparing the acquired real-time image during the process of the cut substrate passing through the conveying route with a second reference image, and determining whether or not there is the dummy substrate on the cut substrate according to a comparison result; wherein, the second reference image is an image during a process of the cut substrate with no dummy substrate passing through the conveying route.

For example, in the dummy substrate detection method according to the embodiments of the disclosure, the matching and comparing the acquired real-time image during the process of the cut substrate passing through the conveying route with the second reference image, and determining whether or not there is the dummy substrate on the cut substrate according to the comparison result, includes steps of:

performing grayscale processing on the second reference image, to generate a pixel grayscale value matrix of the second reference image:

$$G_{xy}^2 = \begin{bmatrix} G^2(1,1) & G^2(1,2) & \ldots & G^2(1,y) \\ G^2(2,1) & G^2(2,2) & \ldots & G^2(2,y) \\ \ldots & \ldots & \ldots & \ldots \\ G^2(x,1) & G^2(x,2) & \ldots & G^2(x,y) \end{bmatrix}$$

where, x and y are respectively a row number and a column number of a pixel in the second reference image; and $G^2(x,y)$ is a grayscale value of the pixel in an x-th row and a y-th column in the second reference image;

defining the acquired real-time image during the cut substrate passing through the conveying route as a second real-time image, and performing grayscale processing on the second real-time image, to generate a pixel grayscale value matrix of the second real-time image:

$$H_{xy}^2 = \begin{bmatrix} H^2(1,1) & H^2(1,2) & \ldots & H^2(1,y) \\ H^2(2,1) & H^2(2,2) & \ldots & H^2(2,y) \\ \ldots & \ldots & \ldots & \ldots \\ H^2(x,1) & H^2(x,2) & \ldots & H^2(x,y) \end{bmatrix}$$

where, x and y are respectively a row number and a column number of a pixel in the second real-time image; and $H^2(x,y)$ is a grayscale value of the pixel in an x-th row and a y-th column in the second real-time image;

intercepting an E*F sub-matrix $G_{EF}$ from the pixel grayscale value matrix of the second reference image, and defining the sub-matrix as a second reference sub-matrix;

obtaining an E*F sub-matrix matching the second reference sub-matrix from the pixel grayscale value matrix of the second real-time image, and defining the sub-matrix as a second real-time sub-matrix;

performing error analysis between the second real-time sub-matrix and the second reference sub-matrix, and determining whether or not there is the dummy substrate on the cut substrate according to an error analysis result.

For example, in the dummy substrate detection method according to the embodiments of the disclosure, the obtaining the E*F sub-matrix matching the second reference sub-matrix from the pixel grayscale value matrix of the second real-time image, includes:

setting an E*F sub-matrix $H_{EF}^{e,f}$ intercepted with an e-th row and an f-th column as starting position from the pixel grayscale value matrix of the second real-time image as the E*F sub-matrix matching the second reference sub-matrix, where, $1 \le e+E \le x$, $1 \le f+F \le y$;

defining a second matching function:

$$D_{(e,f)} = \sum_{i=1}^{E}\sum_{j=1}^{F}\left[H_{EF}^{e,f}(i,j)\right]^2 - 2\sum_{i=1}^{E}\sum_{j=1}^{F}\left[H_{EF}^{e,f}(i,j) \cdot G_{EF}(i,j)\right] + \sum_{i=1}^{E}\sum_{j=1}^{F}\left[G_{EF}(i,j)\right]^2;$$

where, $H_{EF}^{e,f}(i,j)$ is an element of an i-th row and a j-th column in the matrix $H_{EF}^{e,f}$, and $G_{EF}(i,j)$ is an element of an i-th row and a j-th column in the matrix $G_{EF}$;

defining a second correlation function:

$$R_{(e,f)} = \frac{\sum_{i=1}^{E}\sum_{j=1}^{F}\left[H_{EF}^{e,f}(i,j) \cdot G_{EF}(i,j)\right]}{\sum_{i=1}^{E}\sum_{j=1}^{F}\left[H_{EF}^{e,f}(i,j)\right]^2};$$

calculating numerical values of e and f when the second correlation function $R_{(e,f)}$ is closest to 1, and obtaining the E*F sub-matrix $H_{EF}^{e,f}$ matching the second reference sub-matrix, according to the numerical values of e and f.

For example, in the dummy substrate detection method according to the embodiments of the disclosure, the performing error analysis between the second real-time sub-matrix and the second reference sub-matrix, and determining whether or not there is the dummy substrate on the cut substrate according to the error analysis result, includes:

defining a second single pixel absolute error:

$\varepsilon^2(i,j) = |\{H_{EF}^{e,f}(i,j) - \overline{H}\} - \{G_{EF}(i,j) - \overline{G}\}|$ where, $$H = \frac{1}{E \cdot F}\sum_{i=1}^{E}\sum_{j=1}^{F}H_{EF}^{e,f}(i,j); \overline{G} = \frac{1}{E \cdot F}\sum_{i=1}^{E}\sum_{j=1}^{F}G_{EF}(i,j);$$

defining a second objective function, $$E_2 = \sum_{i=1}^{E}\sum_{j=1}^{F}\varepsilon^2(i,j);$$

setting a second objective function threshold $K^2$, and comparing the second objective function with the second objective function threshold $K^2$;

determining that there is the dummy substrate on the cut substrate, if the second objective function is greater than the second objective function threshold $K^2$;

determining that there is no dummy substrate on the cut substrate, if the second objective function is not greater than the second objective function threshold $K^2$.

According to the embodiments of the disclosure, the dummy substrate detector device is provided. The device comprises: an image acquisition component, configured to acquire a real-time image of a conveying route when a cut substrate enters the conveying route, and save the image as a first real-time image; an image processing component, configured to match and compare the first real-time image with a first reference image, and determine whether or not there is a dummy substrate on the conveying route according to a comparison result; wherein, the first reference image is an image of the conveying route with no dummy substrate.

For example, in the dummy substrate detector device according to the embodiments of the disclosure, the image processing component includes:

a matrix processor element, configured to:

perform grayscale processing on the first reference image, to generate a pixel grayscale value matrix of the first reference image:

$$G_{xy}^1 = \begin{bmatrix} G^1(1,1) & G^1(1,2) & \ldots & G^1(1,y) \\ G^1(2,1) & G^1(2,2) & \ldots & G^1(2,y) \\ \ldots & \ldots & \ldots & \ldots \\ G^1(x,1) & G^1(x,2) & \ldots & G^1(x,y) \end{bmatrix}$$

where, x and y are respectively a row number and a column number of a pixel in the first reference image; and $G^1(x,y)$ is a grayscale value of the pixel in an x-th row and a y-th column in the first reference image;

perform grayscale processing on the first real-time image, to generate a pixel grayscale value matrix of the first real-time image:

$$H_{xy}^1 = \begin{bmatrix} H^1(1,1) & H^1(1,2) & \ldots & H^1(1,y) \\ H^1(2,1) & H^1(2,2) & \ldots & H^1(2,y) \\ \ldots & \ldots & \ldots & \ldots \\ H^1(x,1) & H^1(x,2) & \ldots & H^1(x,y) \end{bmatrix}$$

where, x and y are respectively a row number and a column number of a pixel in the first real-time image; and $H^1(x,y)$ is a grayscale value of the pixel located in an x-th row and a y-th column in the first real-time image;

a matrix matcher element, configured to:

intercept an M*N sub-matrix $G_{MN}$ from the pixel grayscale value matrix of the first reference image, and define the sub-matrix as a first reference sub-matrix;

obtain an M*N sub-matrix matching the first reference sub-matrix from the pixel grayscale value matrix of the first real-time image, and define the sub-matrix as a first real-time sub-matrix;

an analyzer element, configured to:

perform error analysis between the first real-time sub-matrix and the first reference sub-matrix, and determine whether or not there is the dummy substrate on the conveying route according to an error analysis result.

For example, in the dummy substrate detector device according to the embodiments of the disclosure, the matrix matcher element is configured to:

set an M*N sub-matrix $H_{MN}^{m,n}$ intercepted with an m-th row and an n-th column as starting position from the pixel grayscale value matrix of the first real-time image as the M*N sub-matrix matching the first reference sub-matrix $G_{MN}$, where, $1 \leq m+M \leq x$, $1 \leq n+N \leq y$;

define a first matching function:

$$D_{(m,n)} = \sum_{i=1}^{M}\sum_{j=1}^{N}[H_{MN}^{m,n}(i,j)]^2 - 2\sum_{i=1}^{M}\sum_{j=1}^{N}[H_{MN}^{m,n}(i,j) \cdot G_{MN}(i,j)] + \sum_{i=1}^{M}\sum_{j=1}^{N}[G_{MN}(i,j)]^2;$$

where, $H_{MN}^{m,n}(i,j)$ is an element of an i-th row and a j-th column in the matrix $H_{MN}^{m,n}$, and $G_{MN}(i,j)$ is an element of an i-th row and a j-th column in the matrix $G_{MN}$;

define a first correlation function:

$$R_{(m,n)} = \frac{\sum_{i=1}^{M}\sum_{j=1}^{N}[H_{MN}^{m,n}(i,j) \cdot G_{MN}(i,j)]}{\sum_{i=1}^{M}\sum_{j=1}^{N}[H_{MN}^{m,n}(i,j)]^2};$$

calculate numerical values of m and n when the first correlation function $R_{(m,n)}$ is closest to 1, and obtain the M*N sub-matrix $H_{MN}^{m,n}$ matching the first reference sub-matrix according to the numerical values of m and n;

the analyzer element, configured to:
define a first single pixel absolute error:

$\varepsilon^1(i,j) = |\{H_{MN}^{m,n}(i,j) - \overline{H}\} - \{G_{MN}(i,j) - \overline{G}\}|;$ where, $$\overline{H} = \frac{1}{M \cdot N}\sum_{i=1}^{M}\sum_{j=1}^{N}H_{MN}^{m,n}(i,j), \quad \overline{G} = \frac{1}{M \cdot N}\sum_{i=1}^{M}\sum_{j=1}^{N}G_{MN}(i,j);$$

define a first objective function, $$E_1 = \sum_{i=1}^{M}\sum_{j=1}^{N}\varepsilon^1(i,j);$$

set a first objective function threshold $K^1$, and compare the first objective function with the first objective function threshold $K^1$;

determine that there is the dummy substrate on the conveying route, if the first objective function is greater than the first objective function threshold $K^1$;

determine that there is no dummy substrate on the conveying route, if the first objective function is not greater than the first objective function threshold K.

For example, in the dummy substrate detector device according to the embodiments of the disclosure, the image acquisition component is further configured to acquire a real-time image during a process of the cut substrate passing through the conveying route, and save the image as a second real-time image; the image processing component is further configured to match and compare the second real-time image with a second reference image, and determine whether or not there is the dummy substrate on the cut substrate according to a comparison result; wherein, the second reference image is an image during the process of the cut substrate with no dummy substrate passing through the conveying route.

For example, in the dummy substrate detector device according to the embodiments of the disclosure, in the image processing component, the matrix processor element, is further configured to:
perform grayscale processing on the second reference image, to generate a pixel grayscale value matrix of the second reference image:

$$G_{xy}^2 = \begin{bmatrix} G^2(1,1) & G^2(1,2) & \cdots & G^2(1,y) \\ G^2(2,1) & G^2(2,2) & \cdots & G^2(2,y) \\ \cdots & \cdots & \cdots & \cdots \\ G^2(x,1) & G^2(x,2) & \cdots & G^2(x,y) \end{bmatrix}$$

where, x and y are respectively a row number and a column number of a pixel in the second reference image; and $G^2(x,y)$ is a grayscale value of the pixel in an x-th row and a y-th column in the second reference image;

perform grayscale processing on the second real-time image, to generate a pixel grayscale value matrix of the second real-time image:

$$H_{xy}^2 = \begin{bmatrix} H^2(1,1) & H^2(1,2) & \cdots & H^2(1,y) \\ H^2(2,1) & H^2(2,2) & \cdots & H^2(2,y) \\ \cdots & \cdots & \cdots & \cdots \\ H^2(x,1) & H^2(x,2) & \cdots & H^2(x,y) \end{bmatrix}$$

where, x and y are respectively a row number and a column number of a pixel in the second real-time image; and $H^2(x,y)$ is a grayscale value of the pixel in an x-th row and a y-th column in the second real-time image;

the matrix matcher element is further configured to:
intercept an E*F sub-matrix $G_{EF}$ from the pixel grayscale value matrix of the second reference image; and define the sub-matrix as a second reference sub-matrix;

obtain an E*F sub-matrix matching the second reference sub-matrix from the pixel grayscale value matrix of the second real-time image, and define the sub-matrix as a second real-time sub-matrix;

the analyzer element is further configured to:
perform error analysis between the second real-time sub-matrix and the second reference sub-matrix, and determine whether or not there is the dummy substrate on the cut substrate according to an error analysis result.

For example, in the dummy substrate detector device according to the embodiments of the disclosure, the matrix matcher element is configured to:

set the E*F sub-matrix $H_{G_{EF}}^{e,f}$ intercepted with an e-th row and an f-th column as starting position from the pixel grayscale value matrix of the second real-time image as the E*F sub-matrix matching the second reference sub-matrix $G_{EF}$, where, $1 \leq e+E \leq x$, $1 \leq f+F \leq y$;

define a second matching function:

$$D_{(e,f)} = \sum_{i=1}^{E}\sum_{j=1}^{F}\left[H_{EF}^{e,f}(i,j)\right]^2 - 2\sum_{i=1}^{E}\sum_{j=1}^{F}\left[H_{EF}^{e,f}(i,j) \cdot G_{EF}(i,j)\right] + \sum_{i=1}^{E}\sum_{j=1}^{F}[G_{EF}(i,j)]^2;$$

where, $H_{EF}^{e,f}(i,j)$ is an element of an i-th row and a j-th column in the matrix $H_{EF}^{e,f}$, and $G_{EF}(i,j)$ is an element of an i-th row and a j-th column in the matrix $G_{EF}$;

define a second correlation function:

$$R_{(e,f)} = \frac{\sum_{i=1}^{E}\sum_{j=1}^{F}\left[H_{EF}^{e,f}(i,j) \cdot G_{EF}(i,j)\right]}{\sum_{i=1}^{E}\sum_{j=1}^{F}\left[H_{EF}^{e,f}(i,j)\right]^2};$$

calculate numerical values of e and f when the second correlation function $R_{(e,f)}$ is closest to 1, and obtain the E*F sub-matrix $H_{EF}^{e,f}$ matching the second reference sub-matrix, according to the numerical values of e and f;

the analyzer element is configured to:

define a second single pixel absolute error:

$$\varepsilon^2(i,j) = |\{H_{EF}^{e,f}(i,j) - \overline{H}\} - \{G_{EF}(i,j) - \overline{G}\}|$$

where, $$\overline{H} = \frac{1}{E \cdot F}\sum_{i=1}^{E}\sum_{j=1}^{F}H_{EF}^{e,f}(i,j);$$

$$\overline{G} = \frac{1}{E \cdot F}\sum_{i=1}^{E}\sum_{j=1}^{F}G_{EF}(i,j);$$

define a second objective function, $$E_2 = \sum_{i=1}^{E}\sum_{j=1}^{F}\varepsilon^2(i,j);$$

set a second objective function threshold $K^2$, and compare the second objective function with the second objective function threshold $K^2$;

determine that there is the dummy substrate on the cut substrate, if the second objective function is greater than the second objective function threshold $K^2$;

determine that there is no dummy substrate on the cut substrate, if the second objective function is not greater than the second objective function threshold $K^2$.

According to the embodiments of the disclosure, the dummy substrate detector system is provided. The method comprises the dummy substrate detector device as described above; and, a conveyor device, configured to convey the cut substrate through the conveying route; a driver device, configured to drive the conveyor device to move; a first sensor, at a starting end of the conveying route, configured to sense the cut substrate and generate a first sensing signal; a main controller device, in signal connection with the image acquisition component, the image processing component, the driver device and the first sensor, configured to: control the driver device to stop driving the conveyor device, when receiving the first sensing signal of the first sensor, and control the image acquisition component to acquire the real-time image of the conveying route; and, control the driver device to drive the conveyor device to continue to move, in a case where the image processing component determines that there is no dummy substrate on the conveying route.

For example, the dummy substrate detector system according to the embodiments of the disclosure further comprises: a second sensor in signal connection with the main controller device, wherein, the second sensor is in the conveying route, and is configured to sense the cut substrate and generate a sensing signal; the main controller device, further configured to: control the image acquisition component to acquire the real-time image during the process of the cut substrate sensed by the second sensor passing through the conveying route, when receiving the second sensing signal of the second sensor; and generate an alarm signal, in a case where the image processing component determines that there is the dummy substrate on the cut substrate.

For example, in the dummy substrate detector system according to the embodiments of the disclosure, the image acquisition component includes a one-dimensional linear image sensor and a servo driver configured to drive the one-dimensional linear image sensor to move so as to obtain an image.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Expressions such as "include" or "comprise" and the like denote that elements or objects appearing before the words of "include" or "comprise" cover the elements or the objects enumerated after the words of "include" or "comprise" or equivalents thereof, not exclusive of other elements or objects. Expressions such as "up", "down", "left", "right" and the like are only used for expressing relative positional relationship, the relative positional relationship may be correspondingly changed in a case where the absolute position of a described object is changed.

At least one embodiment of the present disclosure provides a dummy substrate detection method, comprising: acquiring a real-time image of a conveying route when a cut substrate, which has been cut, enters the conveying route; matching and comparing the acquired real-time image of the conveying route with a first reference image, and determining whether or not there is a dummy substrate on the conveying route according to a comparison result; in which, the first reference image is an image of the conveying route with no dummy substrate. For example, FIG. 1 is a flow chart of the dummy substrate detection method provided by the embodiments of the present disclosure.

Figure 1:
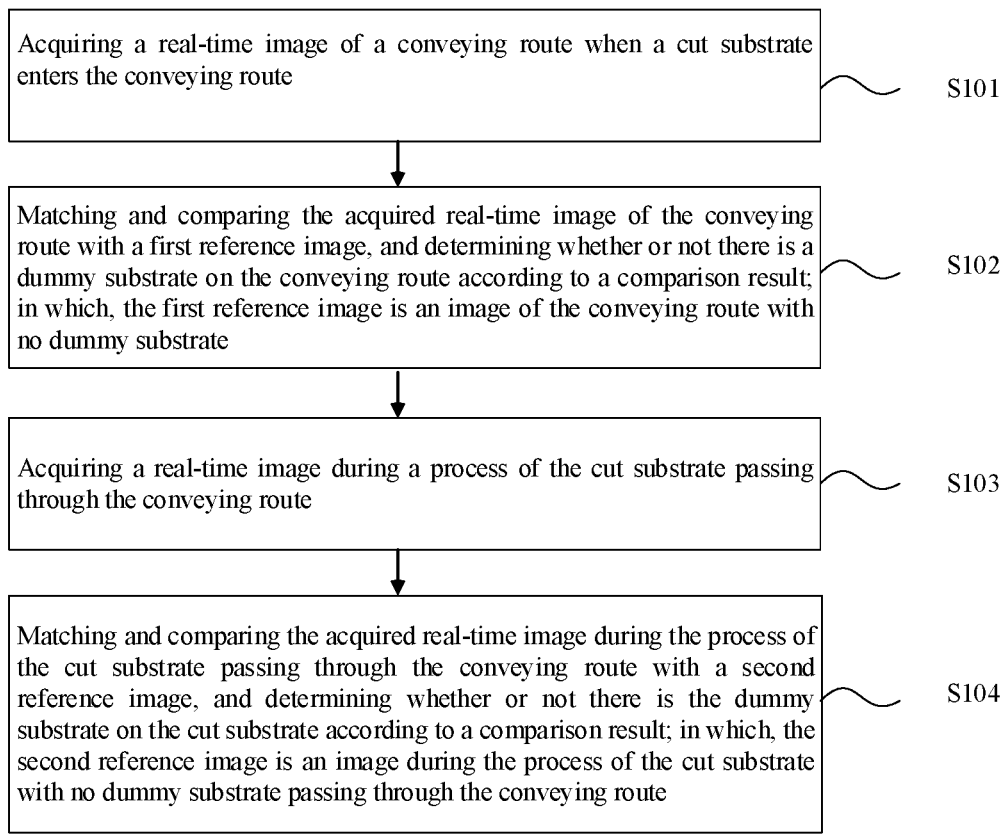
FIG. 1 is a flow chart of a dummy substrate detection method provided by embodiments of the present disclosure.

As shown in FIG. 1, the dummy substrate detection method comprises:

Step S101: acquiring the real-time image of the conveying route when the cut substrate enters the conveying route;

Step S102: matching and comparing the acquired real-time image of the conveying route with the first reference image, and determining whether or not there is the dummy substrate on the conveying route according to the comparison result; in which, the first reference image is the image of the conveying route with no dummy substrate.

In the above-described dummy substrate detection method, in step S101 to step S102, the image of the conveying route with no dummy substrate is taken as the first reference image, and the real-time image of the conveying route when the cut substrate enters the conveying route is compared with the above-described first reference image and analyzed, which accurately and effectively determines whether or not there is the dummy substrate on the conveying route when the cut substrate enters the conveying route, so as to achieve the detection of the dummy substrate on the conveying route. Therefore, by using the above-described dummy substrate detection method, the dummy substrate dropped in the conveying route is effectively detected, so as to prevent the cut substrate which is to pass through the conveying route from being scratched.

Figure 2:
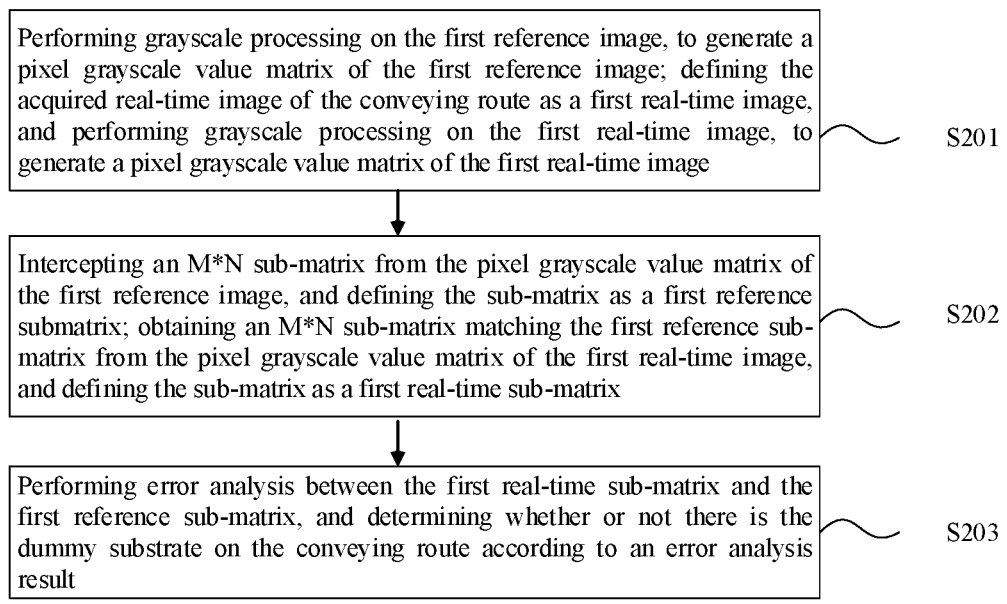
FIG. 2 is a flow chart of step S103 in the dummy substrate detection method in FIG. 1.

As shown in FIG. 1 and FIG. 2, in the embodiments of the present disclosure, step S102, i.e., matching and comparing the acquired real-time image of the conveying route with the first reference image, and determining whether or not there is the dummy substrate on the conveying route according to the comparison result, includes steps of:

Step S201:

Performing grayscale processing on the first reference image, to generate a pixel grayscale value matrix of the first reference image:

$$G_{xy}^1 = \begin{bmatrix} G^1(1,1) & G^1(1,2) & \cdots & G^1(1,y) \\ G^1(2,1) & G^1(2,2) & \cdots & G^1(2,y) \\ \cdots & \cdots & \cdots & \cdots \\ G^1(x,1) & G^1(x,2) & \cdots & G^1(x,y) \end{bmatrix}$$

Where, x and y are respectively a row number and a column number of a pixel in the first reference image; and $G^1(x,y)$ is a grayscale value of the pixel in an x-th row and a y-th column in the first reference image;

Defining the acquired real-time image of the conveying route as a first real-time image, and performing grayscale processing on the first real-time image, to generate a pixel grayscale value matrix of the first real-time image:

$$H_{xy}^1 = \begin{bmatrix} H^1(1,1) & H^1(1,2) & \cdots & H^1(1,y) \\ H^1(2,1) & H^1(2,2) & \cdots & H^1(2,y) \\ \cdots & \cdots & \cdots & \cdots \\ H^1(x,1) & H^1(x,2) & \cdots & H^1(x,y) \end{bmatrix}$$

Where, x and y are respectively a row number and a column number of a pixel in the first real-time image; and $H^1(x,y)$ is a grayscale value of the pixel in an x-th row and a y-th column in the first real-time image;

Step S202:

Intercepting an M*N sub-matrix $G_{MN}$ from the pixel grayscale value matrix $G_{xy}^1$ of the first reference image, and defining the sub-matrix as a first reference sub-matrix (i.e., a matrix formed by grayscale values of pixels of a partial region of the first reference image);

Obtaining an M*N sub-matrix matching the first reference sub-matrix from the pixel grayscale value matrix $H_{xy}^1$ of the first real-time image, and defining the sub-matrix as a first real-time sub-matrix (i.e., a matrix formed by grayscale values of pixels of a partial region of the first real-time image);

Step S203:

Performing error analysis between the first real-time sub-matrix and the first reference sub-matrix, and determining whether or not there is the dummy substrate on the conveying route according to an error analysis result.

During the image acquisition process, factors such as slight mechanical vibration may cause a mismatch between the pixels of the first reference image and the pixels the first real-time image. In step S102 of the dummy substrate detection method provided by the embodiments of the present disclosure, the first reference sub-matrix and the first real-time sub-matrix are obtained by matching processing, and then the error analysis is performed between the first reference sub-matrix and the first real-time sub-matrix to determine whether or not there is the dummy substrate on the conveying route; and thus the method according to the embodiments of the disclosure avoids erroneous determination caused by interference of factors such as environment and mechanical stability.

As shown in FIG. 2, on the basis of the above-described embodiments, in step S202, the obtaining the M*N sub-matrix matching the first reference sub-matrix from the pixel grayscale value matrix of the first real-time image, for example is implemented in a mode below:

Setting an M*N sub-matrix $H_{MN}^{m,n}$ intercepted with an m-th row and an n-th column as starting position from the pixel grayscale value matrix $H_{xy}^1$ of the first real-time image as the sub-matrix matching the first reference sub-matrix $G_{MN}$, where, $1 \leq m+M \leq x$, $1 \leq n+N \leq y$, Defining a first matching function:

$$D_{(m,n)} = \sum_{i=1}^{M}\sum_{j=1}^{N}[H_{MN}^{m,n}(i,j)]^2 - 2\sum_{i=1}^{M}\sum_{j=1}^{N}[H_{MN}^{m,n}(i,j) \cdot G_{MN}(i,j)] + \sum_{i=1}^{M}\sum_{j=1}^{N}[G_{MN}(i,j)]^2;$$

Where, $H_{MN}^{m,n}(i,j)$ is an element of an i-th row and a j-th column in the matrix $H_{MN}^{m,n}$ and $G_{MN}(i,j)$ is an element of an i-th row and a j-th column in the matrix $G_{MN}$;

Defining a first correlation function:

$$R_{(m,n)} = \frac{\sum_{i=1}^{M}\sum_{j=1}^{N}[H_{MN}^{m,n}(i,j) \cdot G_{MN}(i,j)]}{\sum_{i=1}^{M}\sum_{j=1}^{N}[H_{MN}^{m,n}(i,j)]^2};$$

Calculating numerical values of m and n when the first correlation function $R_{(m,n)}$ is closest to 1, and obtaining $H_{MN}^{m,n}$, that is, obtaining the M*N sub-matrix matching the first reference sub-matrix, according to the numerical values of m and n.

According to the embodiments of the disclosure, two sub-matrices (i.e., $G_{MN}$ and $H_{MN}^{m,n}$) whose correlation degree is closest to 1 are respectively extracted from the pixel grayscale value matrix of the first reference image and the pixel grayscale value matrix of the first real-time image, that is, two sub-images matching each other are respectively extracted from the first reference image and the first real-time image, and the two sub-images are compared to determine whether or not there is the dummy substrate on the conveying route, which avoids erroneous determination caused by interference of factors such as environment and mechanical stability. For example, it is required that the two sub-images at least respectively include pixels of a path portion that the cut substrate is to pass on the conveying route, so as to ensure that whether or not there is the dummy substrate on the conveying route is more accurately determined by comparison between the two sub-images, that is, M*N elements of the two sub-matrices should at least respectively include grayscale values of pixels of the image of the path portion that the cut substrate is to pass on the conveying route.

As shown in FIG. 2, on the basis of the above-described embodiments, in step S203, the performing error analysis between the first real-time sub-matrix and the first reference sub-matrix, and determining whether or not there is the dummy substrate on the conveying route according to the error analysis result, for example includes:

Defining a first single pixel absolute error:

$\varepsilon^1(i,j) = |\{H_{MN}^{m,n}(i,j) - \overline{H}\} - \{G_{MN}(i,j) - \overline{G}\}|;$ Where, $$\overline{H} = \frac{1}{M \cdot N}\sum_{i=1}^{M}\sum_{j=1}^{N}H_{MN}^{m,n}(i,j),$$

$$\overline{G} = \frac{1}{M \cdot N}\sum_{i=1}^{M}\sum_{j=1}^{N}G_{MN}(i,j);$$

Defining a first objective function, $$E_1 = \sum_{i=1}^{M}\sum_{j=1}^{N}\varepsilon^1(i,j);$$

Setting a first objective function threshold $K^1$, and comparing the first objective function with the first objective function threshold $K^1$;

Determining that there is the dummy substrate on the conveying route, if the first objective function is greater than the above-described threshold $K^1$;

Determining that there is no dummy substrate on the conveying route, if the first objective function is not greater than the above-described threshold $K^1$.

As shown in FIG. 1, on the basis of the above-described respectively embodiments, the dummy substrate detection method provided by the embodiments of the present disclosure for example further comprise steps of:

Step S103: acquiring a real-time image during a process of the cut substrate passing through the conveying route;

Step S104: matching and comparing the acquired real-time image during the process of the cut substrate passing through the conveying route with a second reference image, and determining whether or not there is the dummy substrate on the cut substrate according to a comparison result; in which, the second reference image is an image during the process of the cut substrate with no dummy substrate passing through the conveying route.

In the dummy substrate detection method provided by the embodiments of the present disclosure, in step S103 to step S104, the image during the process of the cut substrate with no dummy substrate passing through the conveying route is taken as the second reference image, and the real-time image during the process of the cut substrate passing through the conveying route is matched and compared with the above-described second reference image, which accurately and effectively determines whether or not there is the dummy substrate on the cut substrate, so as to achieve the detection of the dummy substrate on the cut substrate, and further, avoids the cut substrate carrying the dummy substrate from being conveyed to a next processing procedure, causing a defect of the product in a production process.

Furthermore, in the dummy substrate detection method provided by the embodiments of the present disclosure, the dummy substrate dropped in the conveying route is detected by step S101 to step S102, and the dummy substrate carried by the cut substrate is detected by step S103 to step S104, and thus, the dummy substrate detection method provided by the embodiments of the present disclosure effectively avoid problems such as that the cut substrate is scratched by the dummy substrate in the conveying route, or the output substrate is defective due to the dummy substrate carried by the output substrate.

Figure 3:
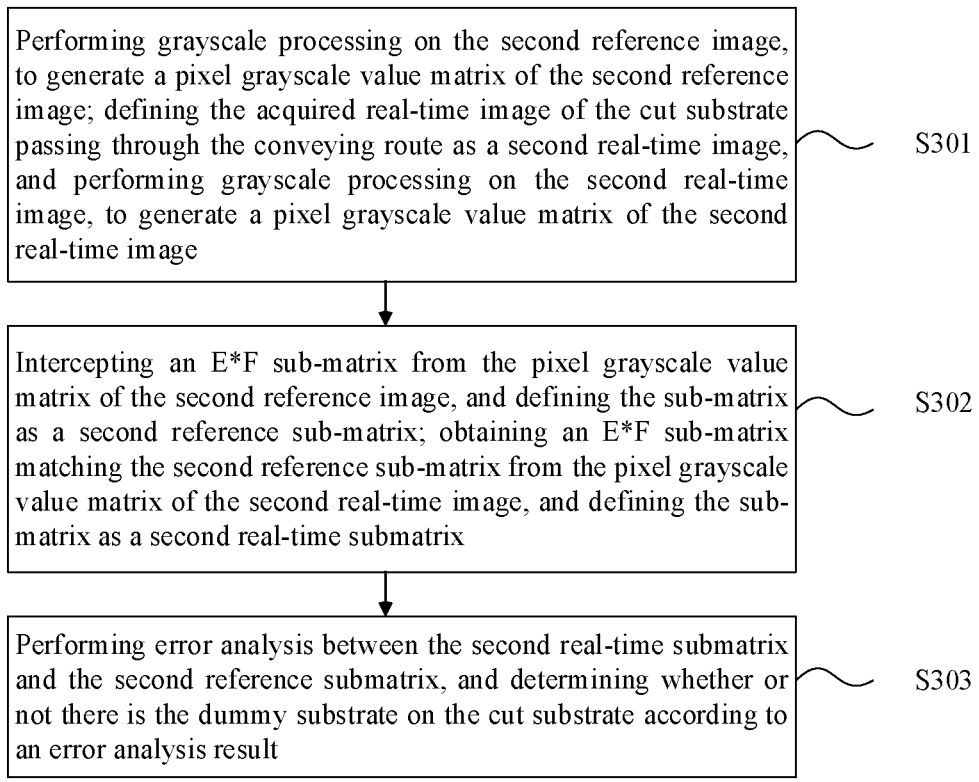
FIG. 3 is a flow chart of step S106 in the dummy substrate detection method in FIG. 1.

As shown in FIG. 1 and FIG. 3, further, a same processing mode for example is used in step S104 as step S102; and step S104, matching and comparing the acquired real-time image during the process of the cut substrate passing through the conveying route with the second reference image, and determining whether or not there is the dummy substrate on the cut substrate according to the comparison result, includes steps of:

Step S301:
Performing grayscale processing on the second reference image, to generate a pixel grayscale value matrix of the second reference image:

$$G_{xy}^2 = \begin{bmatrix} G^2(1,1) & G^2(1,2) & \ldots & G^2(1,y) \\ G^2(2,1) & G^2(2,2) & \ldots & G^2(2,y) \\ \ldots & \ldots & \ldots & \ldots \\ G^2(x,1) & G^2(x,2) & \ldots & G^2(x,y) \end{bmatrix}$$

Where, x and y are respectively a row number and a column number of a pixel in the second reference image; and $G^2(x,y)$ is a grayscale value of the pixel in an x-th row and a y-th column in the second reference image;

Defining the acquired real-time image of the cut substrate passing through the conveying route as a second real-time image, and performing grayscale processing on the second real-time image, to generate a pixel grayscale value matrix of the second real-time image:

$$H_{xy}^2 = \begin{bmatrix} H^2(1,1) & H^2(1,2) & \ldots & H^2(1,y) \\ H^2(2,1) & H^2(2,2) & \ldots & H^2(2,y) \\ \ldots & \ldots & \ldots & \ldots \\ H^2(x,1) & H^2(x,2) & \ldots & H^2(x,y) \end{bmatrix}$$

Where, x and y are respectively a row number and a column number of a pixel in the second real-time image; and $H^2(x,y)$ is a grayscale value of the pixel in an x-th row and a y-th column in the second real-time image;

Step S302:
Intercepting an E*F sub-matrix $G_{EF}$ from the pixel grayscale value matrix of the second reference image, and defining the sub-matrix as a second reference sub-matrix;

Obtaining an E*F sub-matrix matching the second reference sub-matrix from the pixel grayscale value matrix of the second real-time image, and defining the sub-matrix as a second real-time sub-matrix;

Step S303:
Performing error analysis between the second real-time sub-matrix and the second reference sub-matrix, and determining whether or not there is the dummy substrate on the cut substrate according to an error analysis result.

In the dummy substrate detection method provided by the embodiments of the present disclosure, in step S104, the second reference sub-matrix and the second real-time sub-matrix are obtained by matching processing, and error analysis is performed between the second reference sub-matrix and the second real-time sub-matrix, to determine whether or not there is the dummy substrate on the cut substrate; and the method avoids erroneous determination caused by interference of factors such as environment and mechanical stability.

As shown in FIG. 2 and FIG. 3, on the basis of the above-described embodiments, processing modes of step S302 and step S303 for example are respectively the same as those of step S202 and step S203;

For example, in step S302, the obtaining the E*F sub-matrix matching the second reference sub-matrix from the pixel grayscale value matrix of the second real-time image, is implemented in a mode below:

Setting an E*F sub-matrix $H_{EF}^{e,f}$ intercepted with an e-th row and an f-th column as starting position from the pixel grayscale value matrix of the second real-time image as the E*F sub-matrix matching the second reference sub-matrix $G_{EF}$; where, $1 \leq e+E \leq x$, $1 \leq f-F \leq y$;

Defining a second matching function:

$$D_{(e,f)} = \sum_{i=1}^{E}\sum_{j=1}^{F}\left[H_{EF}^{e,f}(i,j)\right]^2 -$$

$$2\sum_{i=1}^{E}\sum_{j=1}^{F}\left[H_{EF}^{e,f}(i,j) \cdot G_{EF}(i,j)\right] + \sum_{i=1}^{E}\sum_{j=1}^{F}\left[G_{EF}(i,j)\right]^2;$$

Where, $H_{EF}^{e,f}(i,j)$ is an element of an i-th row and a j-th column in the matrix $H_{EF}^{e,f}$, and $G_{EF}(i,j)$ EF is an element of an i-th row and a j-th column in the matrix $G_{EF}$;

Defining a second correlation function:

$$R_{(e,f)} = \frac{\sum_{i=1}^{E}\sum_{j=1}^{F}\left[H_{EF}^{e,f}(i,j) \cdot G_{EF}(i,j)\right]}{\sum_{i=1}^{E}\sum_{j=1}^{F}\left[H_{EF}^{e,f}(i,j)\right]^2};$$

Calculating numerical values of e and f when the second correlation function $R_{(e,f)}$ is closest to 1, and obtaining $H_{EF}^{e,f}$, that is, obtaining the E*F sub-matrix matching the second reference sub-matrix, according to the numerical values of e and f.

The above-described processing mode, that is, two sub-matrices (i.e., $G_{EF}$ and $H_{EF}^{e,f}$) whose correlation degree is closest to 1 are respectively extracted from the pixel grayscale value matrix of the second reference image and the pixel grayscale value matrix of the second real-time image, that is, two sub-images matching each other are respectively extracted from the second reference image and the second real-time image, and the two sub-images are compared to determine whether or not there is the dummy substrate on the cut substrate, which avoids erroneous determination caused by interference of factors such as environment and mechanical stability. For example, it is required that each sub-image in the two sub-images at least respectively includes pixels covering the entire cut substrate, to ensure that whether or not there is the dummy substrate on the cut substrate is determined by comparison of the two sub-images, that is, E*F elements of each sub-matrix in the two sub-matrices should at least respectively include grayscale values of pixels covering an image of the entire cut substrate.

Further, step S303, performing error analysis between the second real-time sub-matrix and the second reference sub-matrix, and determining whether or not there is the dummy substrate on the cut substrate according to an error analysis result, for example includes:

Defining a second single pixel absolute error:

$$\varepsilon^2(i,j) = |\{H_{EF}^{e,f}(i,j) - \overline{H}\} - \{G_{EF}(i,j) - \overline{G}\}|$$

Where, $$\overline{H} = \frac{1}{E \cdot F} \sum_{i=1}^{E} \sum_{j=1}^{F} H_{EF}^{e,f}(i,j);$$

$$\overline{G} = \frac{1}{E \cdot F} \sum_{i=1}^{E} \sum_{j=1}^{F} G_{EF}(i,j);$$

Defining a second objective function, $$E_2 = \sum_{i=1}^{E} \sum_{j=1}^{F} \varepsilon^2(i,j);$$

Setting a second objective function threshold $K^2$, and comparing the second objective function with the second objective function threshold $K^2$;

Determining that there is the dummy substrate on the cut substrate, if the second objective function is greater than the above-described threshold $K^2$;

Determining that there is no dummy substrate on the cut substrate, if the second objective function is not greater than the above-described threshold $K^2$.

It should be noted that, since x, y, M, N, m, n, E, F, e, f, as well as i and j as descried above all correspond to row numbers or column numbers in the matrix, their values are all positive integers.

Figure 4:
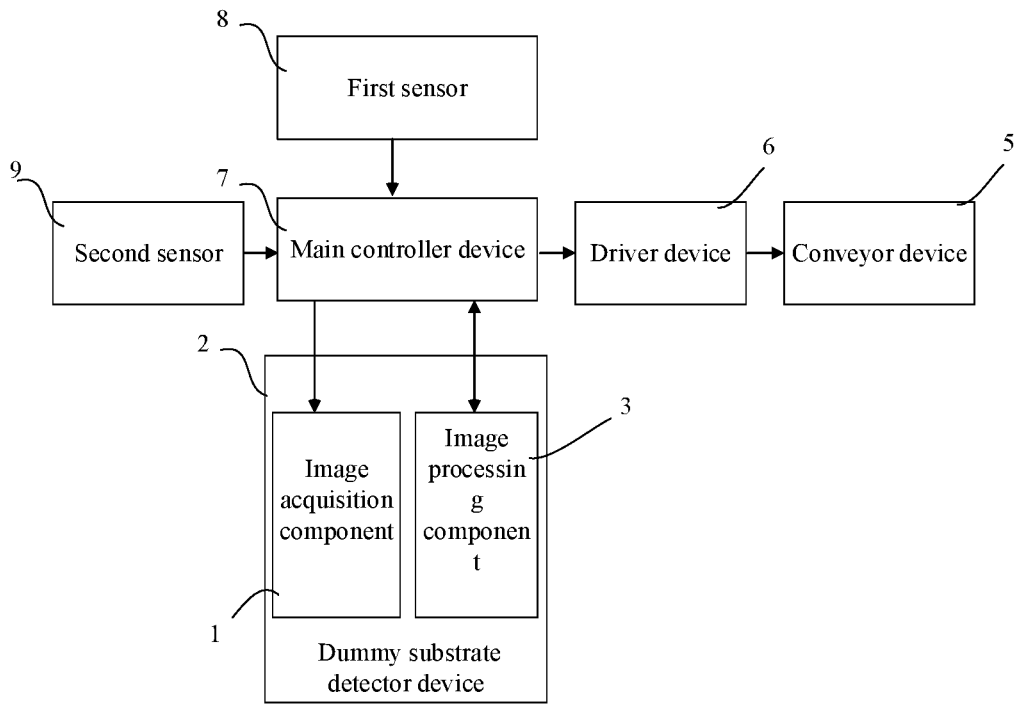
FIG. 4 is a structural block diagram of a dummy substrate detector system provided by the embodiments of the present disclosure.

Based on the dummy substrate detection method according to the embodiments of the present disclosure, the embodiments of the present disclosure further provide a dummy substrate detector device. As shown in FIG. 4, the dummy substrate detector device 1 comprises:

An image acquisition component 2, configured to acquire a real-time image of a conveying route when a cut substrate enters the conveying route, and save the image as a first real-time image;

An image processing component 3, configured to match and compare the first real-time image acquired by the image acquisition component 2 with a first reference image, and determine whether or not there is a dummy substrate on the conveying route according to a comparison result; in which, the first reference image is an image of the conveying route with no dummy substrate.

Figure 5:
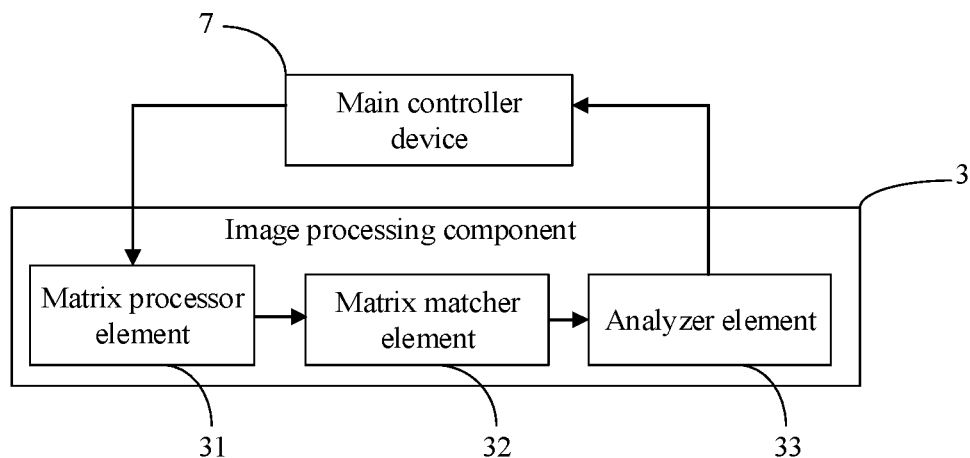
FIG. 5 is a structural block diagram of an image processing component in a dummy substrate detector device provided by the embodiments of the present disclosure.

As shown in FIG. 5, the image processing component 3 for example includes a matrix processor element 31, a matrix matcher element 32 and an analyzer element 33, in which:

The matrix processor element 31 for example performs grayscale processing respectively on the first reference image and the first real-time image, to generate a pixel grayscale value matrix $G_{xy}^1$ of the first reference image according to the first reference image subjected to grayscale processing, and generate a pixel grayscale value matrix $H_{xy}^1$ of the first real-time image according to the first real-time image subjected to grayscale processing, for example, as follows:

$$G_{xy}^1 = \begin{bmatrix} G^1(1,1) & G^1(1,2) & \ldots & G^1(1,y) \\ G^1(2,1) & G^1(2,2) & \ldots & G^1(2,y) \\ \ldots & \ldots & \ldots & \ldots \\ G^1(x,1) & G^1(x,2) & \ldots & G^1(x,y) \end{bmatrix}$$

Where, x and y are respectively a row number and a column number of a pixel in the first reference image; and $G^1(x,y)$ is a grayscale value of the pixel in an x-th row and a y-th column in the first reference image;

$$H_{xy}^1 = \begin{bmatrix} H^1(1,1) & H^1(1,2) & \ldots & H^1(1,y) \\ H^1(2,1) & H^1(2,2) & \ldots & H^1(2,y) \\ \ldots & \ldots & \ldots & \ldots \\ H^1(x,1) & H^1(x,2) & \ldots & H^1(x,y) \end{bmatrix}$$

Where, x and y are respectively a row number and a column number of a pixel in the first real-time image; and $H^1(x,y)$ is a grayscale value of the pixel located in an x-th row and a y-th column in the first real-time image;

The matrix matcher element 32 for example intercepts an M*N sub-matrix (i.e., a first reference sub-matrix) from the pixel grayscale value matrix of the first reference image, and obtain an M*N sub-matrix (i.e., a first real-time sub-matrix) matching the first reference sub-matrix from the pixel grayscale value matrix of the first real-time image;

The analyzer element 33 for example performs error analysis between the first real-time sub-matrix and the first reference sub-matrix, and determines whether or not there is the dummy substrate on the conveying route according to an error analysis result.

As shown in FIG. 5, on the basis of the above-described embodiments, the matrix matcher element 32 for example implements obtaining the first real-time sub-matrix from the pixel grayscale value matrix of the first real-time image in a mode below:

Setting an M*N sub-matrix $H_{MN}^{m,n}$ intercepted with an m-th row and an n-th column as starting position from the pixel grayscale value matrix of the first real-time image as the M*N sub-matrix matching the first reference sub-matrix $G_{MN}$, where, $1 \leq m+M \leq x$, $1 \leq n+N \leq y$;

Defining a first matching function:

$$D_{(m,n)} = \sum_{i=1}^{M} \sum_{j=1}^{N} [H_{MN}^{m,n}(i,j)]^2 -$$

$$2 \sum_{i=1}^{M} \sum_{j=1}^{N} [H_{MN}^{m,n}(i,j) \cdot G_{MN}(i,j)] + \sum_{i=1}^{M} \sum_{j=1}^{N} [G_{MN}(i,j)]^2$$

Where, $H_{MN}^{m,n}(i,j)$ is an element of an i-th row and a j-th column in the matrix $H_{MN}^{m,n}$, and $G_{MN}(i,j)$ is an element of an i-th row and a j-th column in the matrix $G_{MN}$;

Defining a first correlation function:

$$R_{(m,n)} = \frac{\sum_{i=1}^{M}\sum_{j=1}^{N}[H_{MN}^{m,n}(i,j) \cdot G_{MN}(i,j)]}{\sum_{i=1}^{M}\sum_{j=1}^{N}[H_{MN}^{m,n}(i,j)]^2};$$

Calculating numerical values of m and n when the first correlation function $R_{(m,n)}$ is closest to 1, and obtaining $H_{MN}^{m,n}$ according to the numerical values of m and n, that is, obtaining the M*N sub-matrix matching the first reference sub-matrix.

As shown in FIG. 5, on the basis of the above-described embodiments, the analyzer element 33 for example implements performing error analysis between the first real-time sub-matrix and the first reference sub-matrix, and outputting the determination result of whether or not there is the dummy substrate on the conveying route in a processing mode below:

Defining a first single pixel absolute error:

$\varepsilon^1(i,j) = |\{H_{MN}^{m,n}(i,j) - \overline{H}\} - \{G_{MN}(i,j) - \overline{G}\}|$ Where, $$\overline{H} = \frac{1}{M \cdot N}\sum_{i=1}^{M}\sum_{j=1}^{N}H_{MN}^{m,n}(i,j),$$

$$\overline{G} = \frac{1}{M \cdot N}\sum_{i=1}^{M}\sum_{j=1}^{N}G_{MN}(i,j);$$

Defining a first objective function, $$E_1 = \sum_{i=1}^{M}\sum_{j=1}^{N}\varepsilon^1(i,j);$$

Setting a first objective function threshold $K^1$; comparing the first objective function with the first objective function threshold $K^1$, and outputting a determination result.

The determination result is that there is the dummy substrate on the conveying route, if the first objective function is greater than the above-described threshold $K^1$;

The determination result is that there is no dummy substrate on the conveying route, if the first objective function is not greater than the first objective function threshold $K^1$.

As shown in FIG. 4, on the basis of the above-described respectively embodiments, the dummy substrate detector device 1 provided by the embodiments of the present disclosure for example further is used for detecting whether or not there is the dummy substrate on the cut substrate; for example, in the dummy substrate detector device provided by the embodiments of the present disclosure:

The image acquisition component 2 for example is further configured to acquire a real-time image during a process of the cut substrate passing through the conveying route, and save the image as a second real-time image;

Correspondingly, the image processing component 3 for example further is configured to match and compare the second real-time image with a second reference image, and determine whether or not there is the dummy substrate on the cut substrate according to the comparison result; in which, the second reference image is an image during a process of the cut substrate with no dummy substrate passing through the conveying route.

As shown in FIG. 5, on the basis of the above-described embodiments, in the image processing component 3 provided by the embodiments of the present disclosure:

The matrix processor element 31 for example respectively perform grayscale processing on the second reference image and the second real-time image, to generate a pixel grayscale value matrix $G_{xy}^2$ of the second reference image according to the second reference image subjected to grayscale processing, and generate a pixel grayscale value matrix $H_{xy}^2$ of the second real-time image according to the second real-time image subjected to grayscale processing, for example:

$$G_{xy}^2 = \begin{bmatrix} G^2(1,1) & G^2(1,2) & \ldots & G^2(1,y) \\ G^2(2,1) & G^2(2,2) & \ldots & G^2(2,y) \\ \ldots & \ldots & \ldots & \ldots \\ G^2(x,1) & G^2(x,2) & \ldots & G^2(x,y) \end{bmatrix}$$

Where, x and y are respectively a row number and a column number of a pixel in the second reference image; and $G^2(x,y)$ is a grayscale value of the pixel in an x-th row and a y-th column in the second reference image;

The second real-time image is subjected to grayscale processing, to generate the pixel grayscale value matrix of the second real-time image:

$$H_{xy}^2 = \begin{bmatrix} H^2(1,1) & H^2(1,2) & \ldots & H^2(1,y) \\ H^2(2,1) & H^2(2,2) & \ldots & H^2(2,y) \\ \ldots & \ldots & \ldots & \ldots \\ H^2(x,1) & H^2(x,2) & \ldots & H^2(x,y) \end{bmatrix}$$

Where, x and y are respectively a row number and a column number of a pixel in the second real-time image; and $H^2(x,y)$ is a grayscale value of the pixel in an x-th row and a y-th column in the second real-time image;

The matrix matcher element 32 for example intercepts an E*F sub-matrix (i.e., a second reference sub-matrix) from the pixel grayscale value matrix of the second reference image; and obtain an E*F sub-matrix (i.e., a second real-time sub-matrix) matching the second reference sub-matrix from the pixel grayscale value matrix of the second real-time image;

The analyzer element 33 for example performs error analysis between the second real-time sub-matrix and the second reference sub-matrix, and determine whether or not there is the dummy substrate on the cut substrate according to an error analysis result.

As shown in FIG. 5, on the basis of the above-described embodiments, the matrix matcher element 32 for example implements obtaining the second real-time sub-matrix from the pixel grayscale value matrix of the second real-time image in a processing mode below:

Setting the E*F sub-matrix $H_{G_{EF}}^{e,f}$ intercepted with an e-th row and an f-th column as starting position from the pixel grayscale value matrix of the second real-time image as the E*F sub-matrix matching the second reference sub-matrix $G_{EF}$, where, $1 \leq e+E \leq x$, $1 \leq f+F \leq y$;

Defining a second matching function:

$$D_{(e,f)} = \sum_{i=1}^{E}\sum_{j=1}^{F}\left[H_{EF}^{e,f}(i,j)\right]^2 - 2\sum_{i=1}^{E}\sum_{j=1}^{F}\left[H_{EF}^{e,f}(i,j)\cdot G_{EF}(i,j)\right] + \sum_{i=1}^{E}\sum_{j=1}^{F}[G_{EF}(i,j)]^2;$$

Where, $H_{EF}^{e,f}(i,j)$ is an element of an i-th row and a j-th column in the matrix $H_{EF}^{e,f}$, and $G_{EF}(i,j)$ is an element of an i-th row and a j-th column in the matrix $G_{EF}$;

Defining a second correlation function:

$$R_{(e,f)} = \frac{\sum_{i=1}^{E}\sum_{j=1}^{F}\left[H_{EF}^{e,f}(i,j)\cdot G_{EF}(i,j)\right]}{\sum_{i=1}^{E}\sum_{j=1}^{F}\left[H_{EF}^{e,f}(i,j)\right]^2};$$

Calculating numerical values of e and f when the second correlation function $R_{(e,f)}$ is closest to 1, and obtaining $H_{EF}^{e,f}$, that is, obtaining the E*F sub-matrix matching the second reference sub-matrix, according to the numerical values of e and f.

As shown in FIG. 5, on the basis of the above-described embodiments, the analyzer element 33 for example implements performing error analysis between the second real-time sub-matrix and the second reference sub-matrix, and outputting the determination result of whether or not there is the dummy substrate on the cut substrate in a processing mode below:

Defining a second single pixel absolute error:

$$\varepsilon^2(i,j) = |\{H_{EF}^{e,f}(i,j) - \overline{H}\} - \{G_{EF}(i,j) - \overline{G}\}|$$

Where, $$\overline{H} = \frac{1}{E\cdot F}\sum_{i=1}^{E}\sum_{j=1}^{F}H_{EF}^{e,f}(i,j); \overline{G} = \frac{1}{E\cdot F}\sum_{i=1}^{E}\sum_{j=1}^{F}G_{EF}(i,j);$$

Defining a second objective function, $$E_2 = \sum_{i=1}^{E}\sum_{j=1}^{F}\varepsilon^2(i,j);$$

Setting a second objective function threshold $K^2$; comparing the second objective function with the second objective function threshold $K^2$, and outputting a determination result;

The determination result is that there is the dummy substrate on the cut substrate, if the second objective function is greater than the second objective function threshold $K^2$;

The determination result is that there is no dummy substrate on the cut substrate, if the second objective function is not greater than the second objective function threshold $K^2$.

Figure 6:
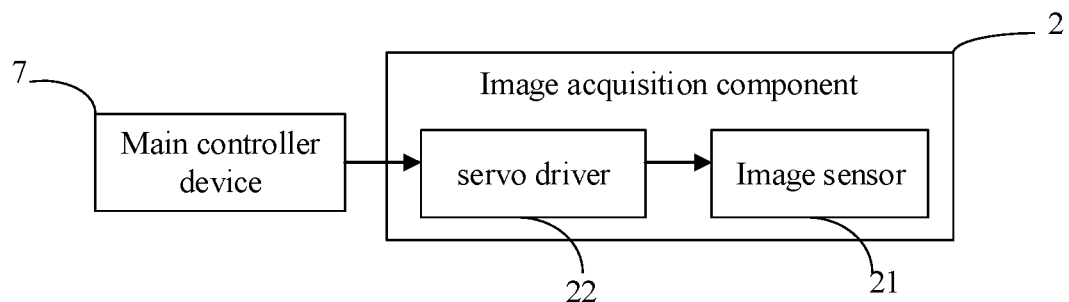
FIG. 6 is a structural block diagram of an image acquisition component in the dummy substrate detector device provided by the embodiments of the present disclosure.

For example, in the dummy substrate detector device 1 provided by the embodiments of the present disclosure, as shown in FIG. 6, the image acquisition component 2 for example includes an image sensor 21, and for example further includes a servo driver 22 for driving the image sensor 21 to acquire an image by scanning; and as shown in FIG. 5, the image processing component 3 for example is a hardware having an image processing function such as a computer.

The servo driver is configured for driving the image sensor to acquire the image by scanning, so that the image acquisition is automatically implements, and further stability of a position of the image acquisition is ensured each time.

On the basis of the above-described embodiments, in the dummy substrate detector device of the embodiments of the present disclosure, the first reference image and the second reference image are images as comparison standards, and therefore, they for example are acquired and stored in the dummy substrate detector device in advance, while the first real-time image and the second real-time image are acquired in real time during the process of conveying the cut substrate; further, the pixel grayscale value matrix of the first reference image for example is directly stored in the dummy substrate detector device, for direct matching and comparison with the pixel grayscale value matrix of the first real-time image; and similarly, the pixel grayscale value matrix of the second reference image for example is directly stored in the dummy substrate detector device, for direct matching and comparison with the pixel grayscale value matrix of the second real-time image.

Further, the second real-time image according to the above-described embodiments for example is a real-time image during the process of the cut substrate passing through a set position of the conveying route; correspondingly, the second reference image is an image during the process of the cut substrate with no dummy passing through the set position of the conveying route; further, in a case where the second real-time image is acquired, a shot of the image acquisition component is fixed at the set position of the conveying route, and when the cut substrate is conveyed through the set position, the image acquisition component obtains the image during the process of the cut substrate passing through the set position of the conveying route, that is, obtain the second real-time image.

Based on the dummy substrate detection method provided by the embodiments of the present disclosure, the embodiments of the present disclosure further provide a dummy substrate detector system, and as shown in FIG. 4, the dummy substrate detector system comprises the dummy substrate detector device 1 according to any one of the above-described embodiments.

Figure 7:
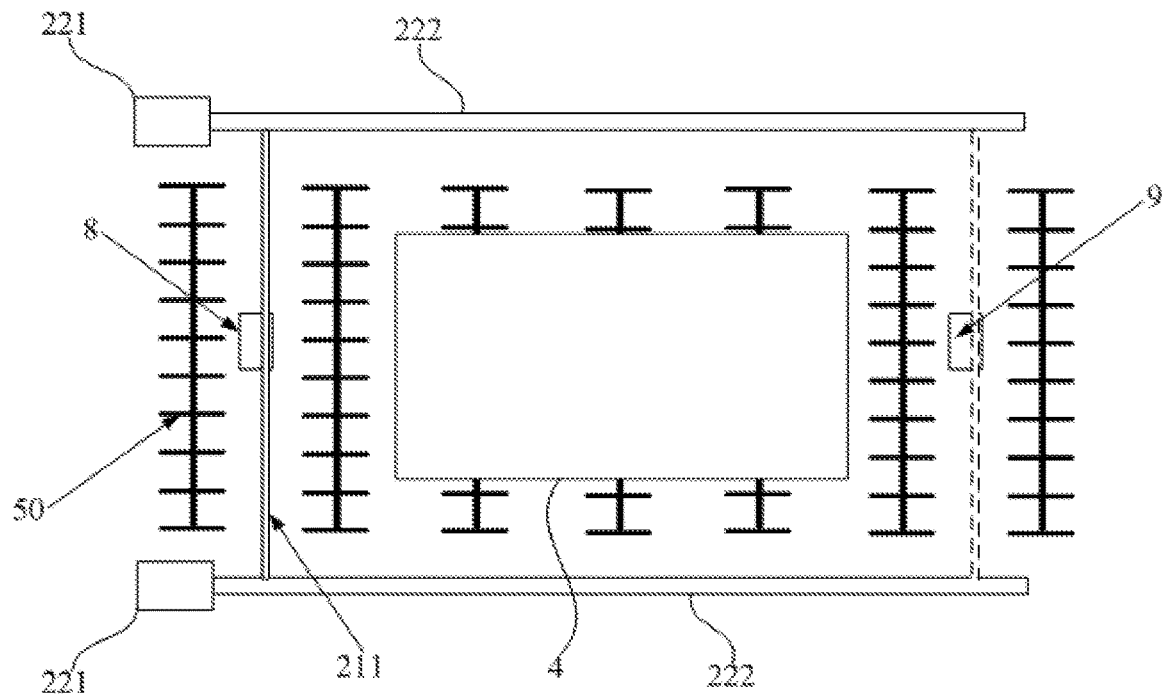
FIG. 7 is a top-view structural schematic diagram of a portion of the dummy substrate detector system provided by the embodiments of the present disclosure.
Figure 8:
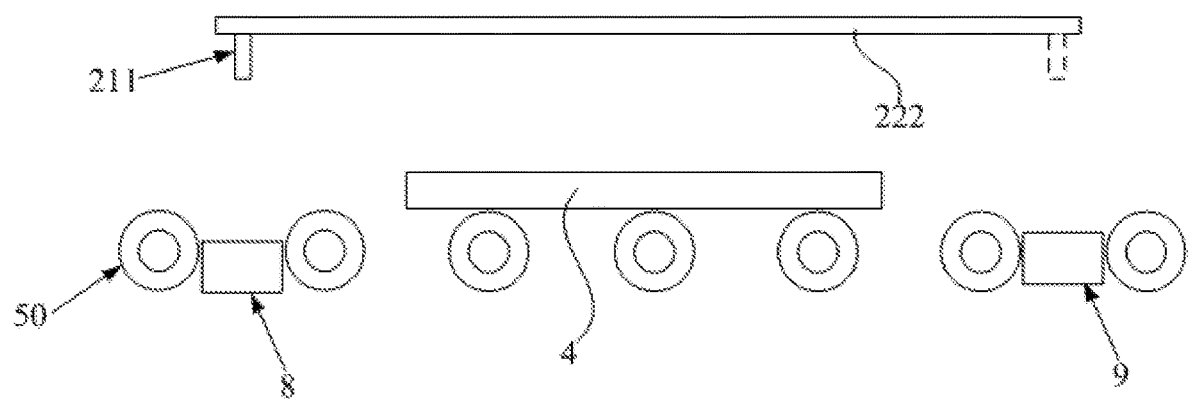
FIG. 8 is a side-view structural schematic diagram of a portion of the dummy substrate detector system provided by the embodiments of the present disclosure.
Figure 9:
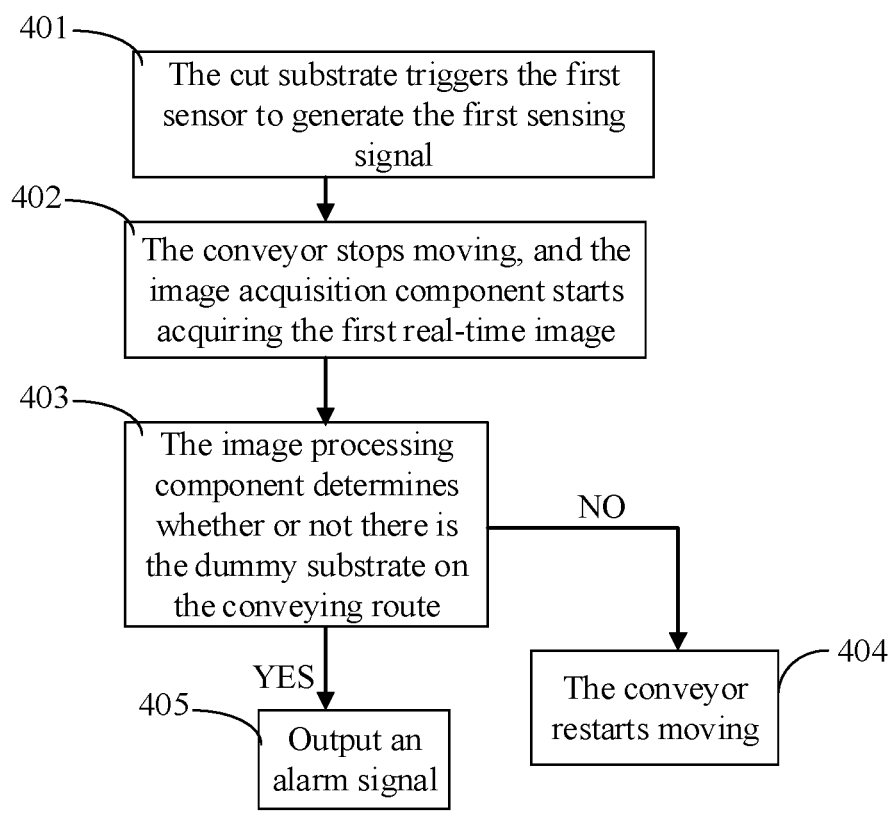
FIG. 9 is a schematic flow chart of the dummy substrate detector system for detecting whether or not there is a dummy substrate on a conveying route provided by the embodiments of the present disclosure.

As shown in FIG. 4 and FIG. 7 to FIG. 8, the dummy substrate detector system provided by the embodiments of the present disclosure further comprises: a conveyor device 5, for conveying the cut substrate 4 so that the cut substrate 4 passes through the conveying route; and a driver device 6, for driving the conveyor device 5 to move; for example, the conveyor device 5 is a roller conveyor 50, or a conveyor device of other type such as a conveyor belt; a conveying path of the conveyor device 5 passes through the conveying route; and the driver device 6 for example is a driving motor, or other driver device such as a stepper motor.

As shown in FIG. 4 and FIG. 7 to FIG. 8, on the basis of the above-described embodiments, the dummy substrate detector system according to the embodiments of the present disclosure for example further includes a first sensor 8 and a main controller device 7.

For example, the first sensor 8 senses the cut substrate 4, and generates a first sensing signal, and the first sensing signal is used as a trigger signal for the dummy substrate detector device 1 to start detecting whether or not there is the dummy substrate on the conveying route; for example, the first sensor 8 is mounted at a starting end of the conveying route, and further, when the cut substrate 4 is conveyed to the starting end of the conveying route, the first sensor 8 senses the cut substrate 4 and generates the first sensing signal.

The main controller device 7 is in signal connection with the driver device 6, the first sensor 8, as well as the image acquisition component 2 and the image processing component 3 in the dummy substrate detector device 1.

On the basis of the above-described embodiments, in a case where the first reference image or the pixel grayscale value matrix of the first reference image is directly pre-stored in the dummy substrate detector device, as shown in FIG. 4 to FIG. 9, the dummy substrate detector system provided by the embodiments of the present disclosure is used for detecting whether or not there is the dummy substrate on the conveying route, and steps below for example are included:

Step S401: conveying, by the conveyor 50, the cut substrate 4 to the starting end of the conveying route, and generating the first sensing signal by the first sensor 8;

Step S402: controlling, by the main controller device 7, the driver device 6 to stop driving the conveyor 50, that is, stop conveying the cut substrate 4, according to the first sensing signal of the first sensor 8; and controlling the image acquisition component 2 to start acquiring the real-time image (the first real-time image) of the conveying route, that is, starting detection whether or not there is the dummy substrate on the conveying route by the dummy substrate detector device 1;

Step S403: determining, by the image processing component 3, whether or not there is the dummy substrate on the conveying route, according to the first reference image or the pixel grayscale value matrix of the first reference image pre-stored in the dummy substrate detector device 1, as well as the above-described first real-time image;

Step S404: controlling, by the main controller device 7, the driver device 6 to drive the conveyor 50 in a case where the image processing component 3 determines that there is no dummy substrate on the conveying route, so as to continue to convey the cut substrate 4, so that the cut substrate 4 passes through the conveying route;

Step S405: controlling, by the main controller device 7, generation of an alarm signal in a case where the image processing component 3 determines that there is the dummy substrate on the conveying route, so as to remind a worker to clear the dummy substrate on the conveying route.

In summary, the dummy substrate detector system according to the embodiments of the present disclosure triggers the dummy substrate detector device 1 to perform the detection when each cut substrate 4 reaches the starting end of the conveying route, so as to determine whether or not there is the dummy substrate on the conveying route; in addition, only in a case where the dummy substrate detector device 1 determines that there is no dummy substrate on the conveying route, the cut substrate 4 is conveyed through the conveying route, and therefore, the dummy substrate detector system provided by the embodiments of the present disclosure effectively prevents the cut substrate 4 from being scratched by the dummy substrate dropped by a previous cut substrate on the way of the conveying route.

Figure 10:
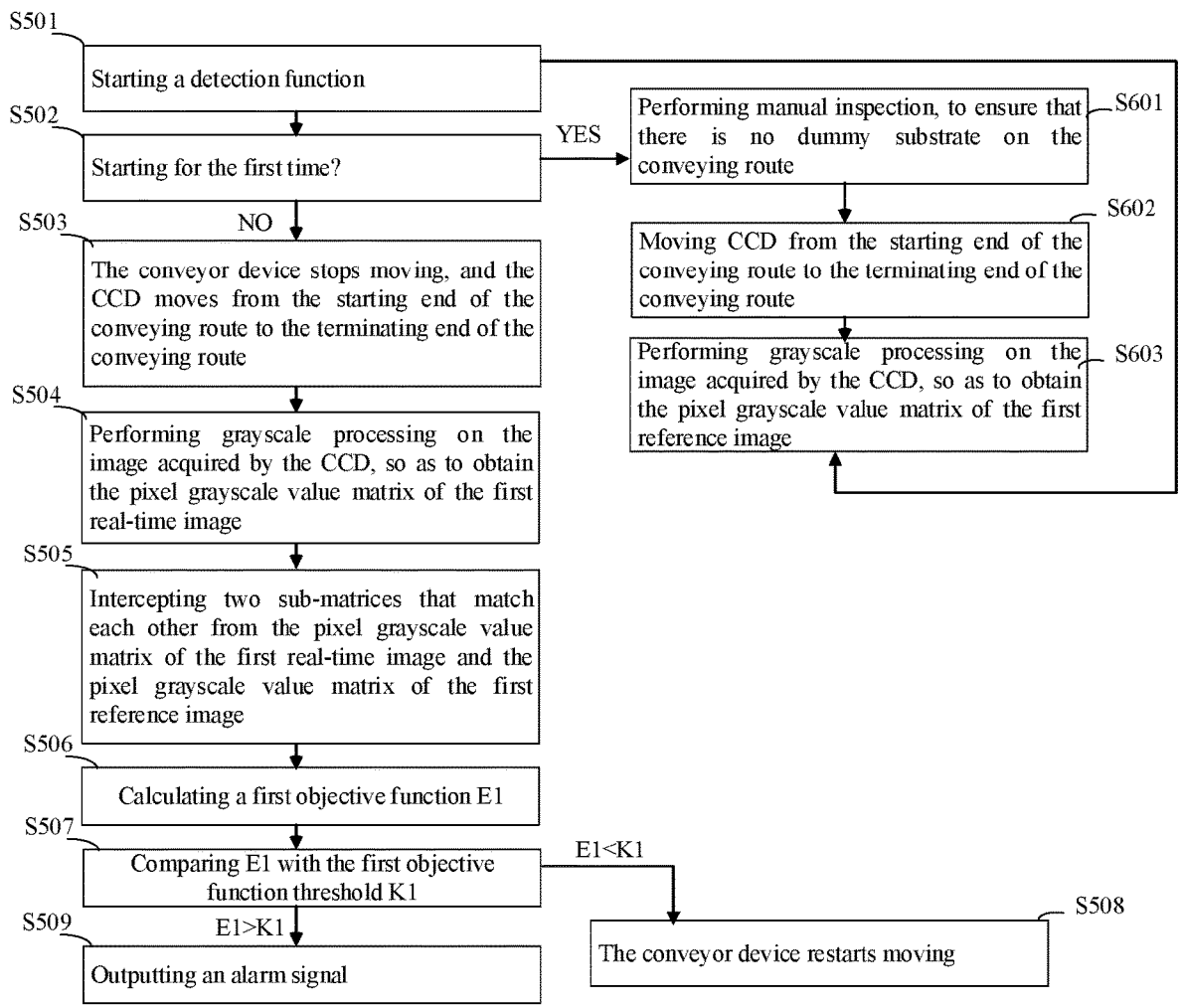
FIG. 10 is another schematic flow chart of the dummy substrate detector system for detecting whether or not there is the dummy substrate on the conveying route provided by embodiments of the present disclosure
Figure 11:
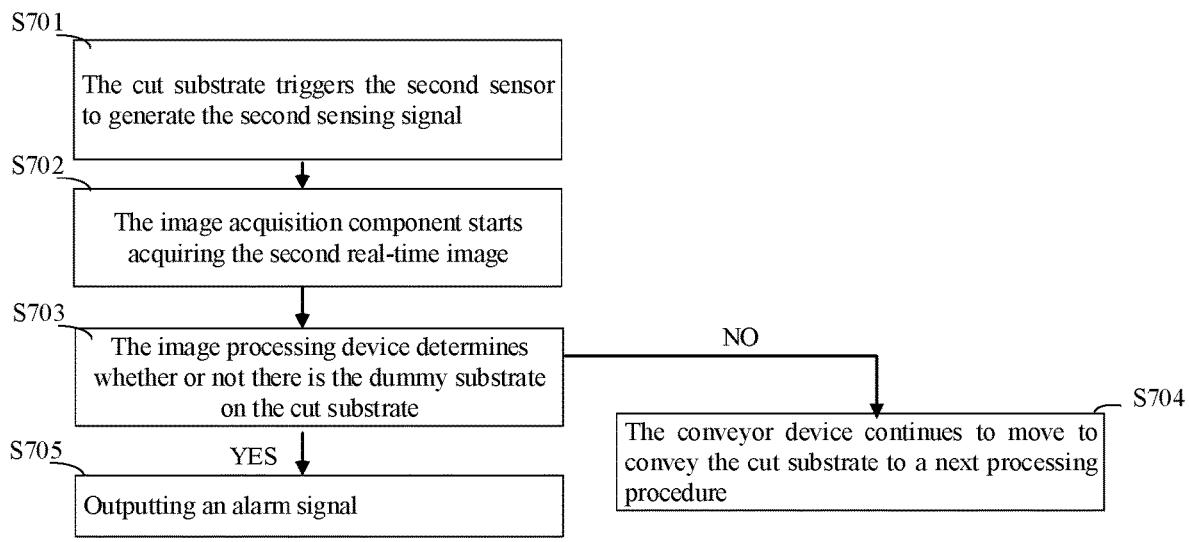
FIG. 11 is a schematic flow chart of the dummy substrate detector system for detecting whether or not there is the dummy substrate on a cut substrate provided by the embodiments of the present disclosure.
Figure 12:
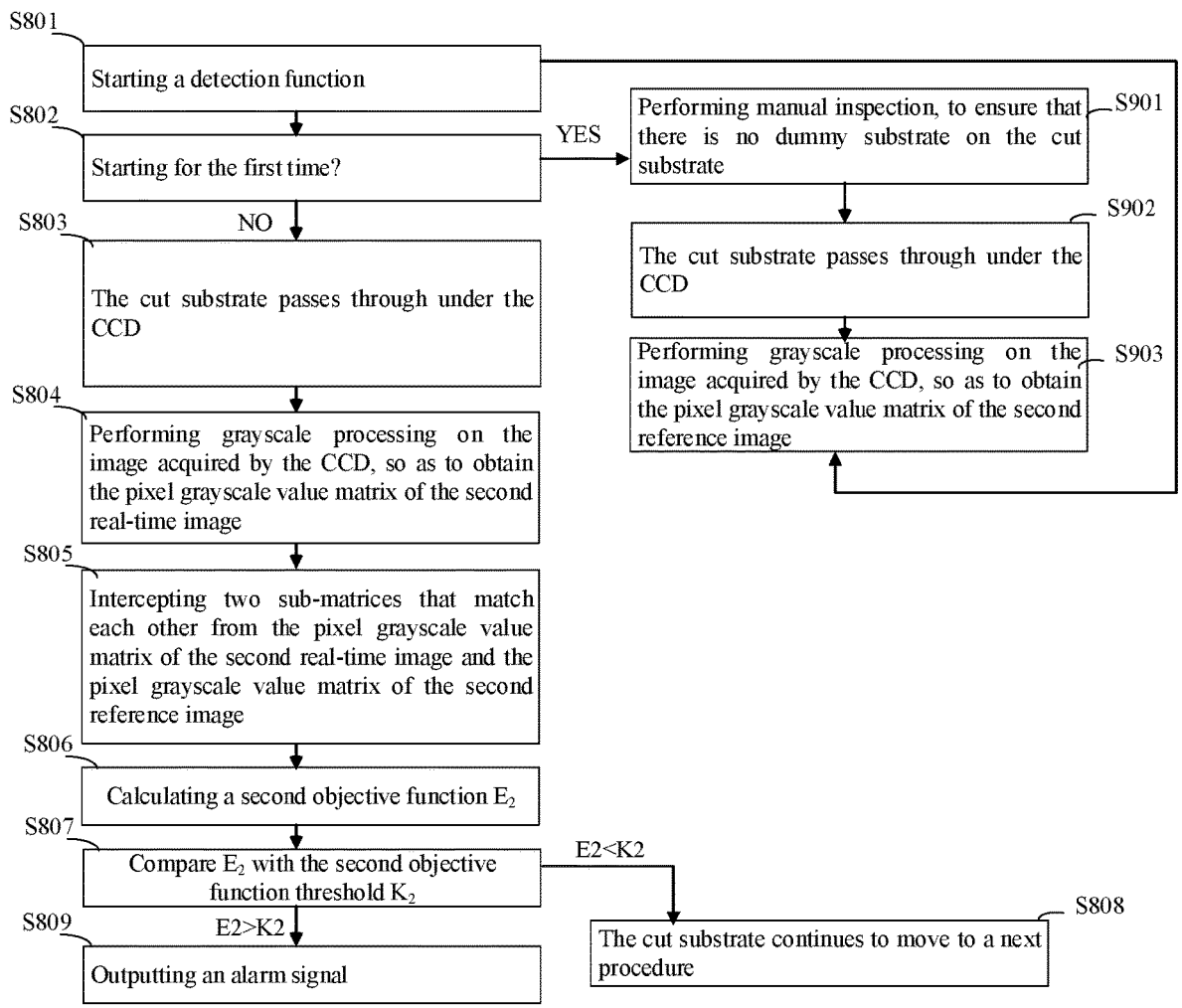
FIG. 12 is another schematic flow chart of the dummy substrate detector system for detecting whether or not there is the dummy substrate on the cut substrate provided by embodiments of the present disclosure.

For example, in a case where the first reference image or the pixel grayscale value matrix of the first reference image is not pre-stored in the dummy substrate detector device 1, as shown in FIG. 10, the dummy substrate detector system provided by the embodiments of the present disclosure is used for detecting whether or not there is the dummy substrate on the conveying route, and steps below for example are included:

Step S501: starting a detection function for detecting the dummy substrate on the conveying route;

Step S502: automatically determining, by the system, whether or not the detection function is started for the first time; if it is started for the first time, firstly executing step S601 to step S603, and then restarting execution from step S501; otherwise, directly executing step S503;

Step S601: performing manual inspection, to ensure that there is no dummy substrate on the conveying route;

Step S602: driving, by the servo driver, a CCD to move from the starting end of the conveying route to a terminating end of the conveying route, so as to obtain the first reference image;

Step S603: transmitting, by the CCD, the first reference image to the matrix processor element, so that the matrix processor element performs grayscale processing on the first reference image, and generates the pixel grayscale value matrix of the first reference image;

Step S503: the conveyor device stopping moving, and driving, by the servo driver, the CCD to move from the starting end of the conveying route to the terminating end of the conveying route, so as to obtain the first real-time image;

Step S504: transmitting, by the CCD, the first real-time image to the matrix processor element, so that the matrix processor element performs grayscale processing on the first real-time image, and generates the pixel grayscale value matrix of the first real-time image;

Step S505: intercepting, by the matrix matcher element, two sub-matrices that match each other from the pixel grayscale value matrix of the first real-time image and the pixel grayscale value matrix of the first reference image;

Step S506: calculating, by the analyzer element, a first objective function E1 according to the two sub-matrices;

Step S507: comparing, by the analyzer element, the first objective function E1 with the first objective function threshold K1; if E1<K1, executing step S508; and if E1>K1, executing step S509;

Step S508: the conveyor device restarting moving so as to continue to convey the cut substrate 4, so that the cut substrate 4 passes through the conveying route;

Step S509: outputting the alarm signal.

As shown in FIG. 4 to FIG. 8, on the basis of the above-described embodiments, the dummy substrate detector system provided by the embodiments of the present disclosure for example further comprises a second sensor 9 in signal connection with the main controller device 7, the second sensor 9 for example senses the cut substrate 4, and generate a second sensing signal, and the second sensing signal is used as a trigger signal to start detecting whether or not there is the dummy substrate on the cut substrate 4.

On the basis of the above-described embodiments, in a case where the second reference image or the pixel grayscale value matrix of the second reference image is directly pre-stored in the dummy substrate detector device, as shown in FIG. 4 to FIG. 8, and FIG. 11, the dummy substrate detector system provided by the embodiments of the present disclosure is used for detecting whether or not there is the dummy substrate on the cut substrate, and steps below for example are included:

Step S701: conveying, by the conveyor 50, the cut substrate 4 to a position where the second sensor 9 is located, so as to trigger the second sensor 9 to generate the second sensing signal;

Step S702: controlling, by the main controller device 7, the image acquisition component 2 to start acquiring the real-time image (the second real-time image) during the process of the cut substrate 4 passing through the conveying route according to the second sensing signal, that is, starting detection of whether or not there is the dummy substrate on the cut substrate 4 by the dummy substrate detector device 1;

Step S703: determining, by the image processing component 3, whether or not there is the dummy substrate on the cut substrate, according to the second reference image or the pixel grayscale value matrix of the second reference image pre-stored in the dummy substrate detector device 1, as well as the above-described second real-time image;

Step S704: controlling, by the main controller device 7, the driver device 6 to continue to drive the conveyor 50, in a case where the image processing component 3 determines that there is no dummy substrate on the cut substrate 4;

Step S705: controlling, by the main controller device 7, generation of an alarm signal, in a case where the image processing component 3 determines that there is the dummy substrate on the cut substrate 4, so as to remind a worker to clear the dummy substrate on the cut substrate 4, or controlling the conveyor 50 to stop conveying the substrate 4.

In summary, in the dummy substrate detector system provided by the embodiments of the present disclosure, when the substrate 4 triggers the second sensor 9, the dummy substrate detector device 1 is triggered to detect whether or not there is the dummy substrate on the cut substrate 4; in addition, only in a case where the dummy substrate detector device 1 determines that there is the dummy substrate on the cut substrate 4, the alarm signal is generated to remind the worker to clear the dummy substrate on the cut substrate 4, and thus, the dummy substrate detector system provided by the embodiments of the present disclosure effectively prevents the dummy substrate from being conveyed to a next processing procedure, causing the cut substrate to be defective.

For example, in a case where the second reference image or the pixel grayscale value matrix of the second reference image is not pre-stored in the dummy substrate detector device 1, as shown in FIG. 10, the dummy substrate detector system provided by the embodiments of the present disclosure is used for detecting whether or not there is the dummy substrate on the base substrate, steps below for example are included:

Step S801: starting a detection function for detecting the dummy substrate on the cut substrate;

Step S802: automatically determining, by the system, whether or not the detection function is started for the first time; if it is started for the first time, executing step S901 to step S903, and then restarting execution from step S801; otherwise, directly executing step S803;

Step S901: performing manual inspection, to ensure that there is no dummy substrate on the cut substrate;

Step S902: driving, by the conveyor device, the cut substrate to pass through under the CCD, so that the CCD acquires the second reference image;

Step S903: transmitting, by the CCD, the second reference image to the matrix processor element, so that the matrix processor element performs grayscale processing on the second reference image, and generates the pixel grayscale value matrix of the second reference image;

Step S803: driving, by the conveyor device, the cut substrate to pass through under the CCD, so that the CCD acquires the second real-time image;

Step S804: transmitting, by the CCD, the acquired second real-time image to the matrix processor element, so that the matrix processor element performs grayscale processing on the second real-time image, and generates the pixel grayscale value matrix of the second real-time image;

Step S805: intercepting, by the matrix matcher element, two sub-matrices that match each other from the pixel grayscale value matrix of the second real-time image and the pixel grayscale value matrix of the second reference image;

Step S806: calculating, by the analyzer element, a second objective function E2 according to the two sub-matrices;

Step S807: comparing, by the analyzer element, the second objective function E2 with the second objective function threshold K2; if E2<K2, executing step S808; and if E2>K2, executing step S809;

Step S808: the conveyor continuing to move, and conveying the cut substrate 4 to pass through the conveying route to a next procedure;

Step S809: outputting the alarm signal.

As shown in FIG. 4 to FIG. 6, in the dummy substrate detector system provided by the embodiments of the present disclosure, the first sensor 8 and the second sensor 9 for example are photoelectric sensors, for example, infrared sensors; and the main controller device 7 for example is implemented with a computer or hardware such as a programmable logic controller (PLC).

As shown in FIG. 6 to FIG. 8, on the basis of the above-described embodiments, in the dummy substrate detector system provided by the embodiments of the present disclosure, the image sensor (i.e. CCD) 21 in the image acquisition component 2 for example is a one-dimensional linear CCD 211 mounted on the conveying route; further, the servo driver 22 for driving the one-dimensional linear CCD 211 to acquire the image by scanning for example includes a servo motor 221 and a servo rail 222 provided along the conveyor 50, and the one-dimensional linear CCD 211 is mounted on the servo rail 222, and is movable along the servo rail 222 to acquire the image by scanning.

As shown in FIG. 7 and FIG. 8, on the basis of the above-described embodiments, the second sensor 9, for example, is mounted at the terminating end of the conveying route.

In the dummy substrate detector system provided by the embodiments of the present disclosure, the dummy substrate detector device 1 detects whether or not there is the dummy substrate on the conveying route, and the one-dimensional linear CCD 211, as driven by the servo driver 22, moves from the starting end to the terminating end of the conveying route, so as to implement acquiring the real-time image (first real-time image) of the conveying route; then, the cut substrate 4 reaches the terminating end of the conveying route and triggers the second sensor 9 so as to further trigger the dummy substrate detector device 1 to start detecting whether or not there is the dummy substrate on the cut substrate 4, the one-dimensional linear CCD 211 just stops at the terminating end of the conveying route, and at this time, since the cut substrate 4 just begins to pass the terminating end of the conveying route, the one-dimensional linear CCD 211, without moving, obtains the process image (the second real-time image) of the cut substrate 4 moving along the conveying route.

In addition, for example, after the one-dimensional linear CCD 211 completes acquisition of the first real-time image and the second real-time image, it, as driven by the servo driver 22, returns to the starting end of the conveying route to prepare for a next round of detection of the dummy substrate.

It should be noted that, the dummy substrate detector system provided by the embodiments of the present disclosure may firstly detect whether or not there is the dummy substrate on the cut substrate, and then detect whether or not there is the dummy substrate on the conveying route; in this case, it is necessary to place the second sensor ahead of the starting end of the conveying route, and the second reference image and the second real-time image acquired are correspondingly images of the cut substrate on a conveying path ahead of the conveying route.

In addition, in the dummy substrate detector system provided by the embodiments of the present disclosure, the cut substrate passing through the conveying route for example is a small piece of substrate obtained after cutting a large piece of mother substrate, or a cut liquid crystal display panel which has been cut; in addition, the above-described small piece of substrate for example is made of various materials such as glass, plastic or acrylic.

As compared with a conventional pin torque detecting method and the vacuum adsorption detecting method, the dummy substrate detection method as well as the dummy substrate detector device and the dummy substrate detector system provided by the embodiments of the present disclosure not only effectively detects the dummy substrate on the conveying route that cannot be detected by using the conventional method, but also effectively detects the dummy substrate carried on a surface of the cut substrate that cannot be detected by using the conventional method; in addition, the dummy substrate detection method provided by the embodiments of the present disclosure does not have any risk of causing physical damage to the cut substrate; the detection result is accurate and the detection process is safe and reliable.

Several points below need to be explained:

(1) The drawings of the embodiments of the present disclosure relate only to the structures involved in the embodiments of the present disclosure, and normal designs may be referred to for other structures.

(2) For the sake of clarity, in the drawings used for describing the embodiments of the present disclosure, thicknesses of layers or regions are enlarged or reduced, that is, these drawings are not drawn in an actual scale. It may be understood that, when an element such as a layer, a film, a region or a substrate is referred to as being located "on" or "below" another element, the element may be "immediately" located "on" or "below" another element, or there may be an intermediate element.

(3) In case of no conflict, the embodiments of the present disclosure and the features in the embodiments may be combined with each other to obtain a new embodiment.

The foregoing embodiments merely are exemplary embodiments of the disclosure, and not intended to define the scope of the disclosure, and the scope of the disclosure is determined by the appended claims.

The invention claimed is:

1. A dummy substrate detection method, comprising:
acquiring a real-time image of a conveying route when a cut substrate enters the conveying route;
matching and comparing the acquired real-time image of the conveying route with a first reference image, and determining whether or not there is a dummy substrate on the conveying route according to a comparison result; wherein, the first reference image is an image of the conveying route with no dummy substrate.

2. The dummy substrate detection method according to claim 1, wherein, the matching and comparing the acquired real-time image of the conveying route with the first reference image, and determining whether or not there is the dummy substrate on the conveying route according to the comparison result, includes:
performing grayscale processing on the first reference image, to generate a pixel grayscale value matrix of the first reference image:

$$G_{xy}^1 = \begin{bmatrix} G^1(1,1) & G^1(1,2) & \ldots & G^1(1,y) \\ G^1(2,1) & G^1(2,2) & \ldots & G^1(2,y) \\ \ldots & \ldots & \ldots & \ldots \\ G^1(x,1) & G^1(x,2) & \ldots & G^1(x,y) \end{bmatrix}$$

where, x and y are respectively a row number and a column number of a pixel in the first reference image; and $G^1(x,y)$ is a grayscale value of the pixel in an x-th row and a y-th column in the first reference image;
defining the acquired real-time image of the conveying route as a first real-time image, and performing grayscale processing on the first real-time image, to generate a pixel grayscale value matrix of the first real-time image:

$$H_{xy}^1 = \begin{bmatrix} H^1(1,1) & H^1(1,2) & \ldots & H^1(1,y) \\ H^1(2,1) & H^1(2,2) & \ldots & H^1(2,y) \\ \ldots & \ldots & \ldots & \ldots \\ H^1(x,1) & H^1(x,2) & \ldots & H^1(x,y) \end{bmatrix}$$

where, x and y are respectively a row number and a column number of a pixel in the first real-time image; and $H^1(x,y)$ is a grayscale value of the pixel in an x-th row and a y-th column in the first real-time image;
intercepting an M*N sub-matrix $G_{MN}$ from the pixel grayscale value matrix of the first reference image, and defining the sub-matrix as a first reference sub-matrix;
obtaining an M*N sub-matrix matching the first reference sub-matrix from the pixel grayscale value matrix of the first real-time image, and defining the sub-matrix as a first real-time sub-matrix; and
performing error analysis between the first real-time sub-matrix and the first reference sub-matrix, and determining whether or not there is the dummy substrate on the conveying route according to an error analysis result.

3. The dummy substrate detection method according to claim 2, wherein, the obtaining the M*N sub-matrix matching the first reference sub-matrix from the pixel grayscale value matrix of the first real-time image, includes:
setting an M*N sub-matrix $H_{MN}^{m,n}$ intercepted with an m-th row and an n-th column as starting position from the pixel grayscale value matrix of the first real-time image as the M*N sub-matrix matching the first reference sub-matrix $G_{MN}$, where, $1 \leq m+M \leq x$, $1 \leq n+N \leq y$;
defining a first matching function:

$$D_{(m,n)} = \sum_{i=1}^{M} \sum_{j=1}^{N} [H_{MN}^{m,n}(i,j)]^2 -$$

-continued $$2\sum_{i=1}^{M}\sum_{j=1}^{N}[H_{MN}^{m,n}(i,j)\cdot G_{MN}(i,j)] + \sum_{i=1}^{M}\sum_{j=1}^{N}[G_{MN}(i,j)]^2$$

where, $H_{MN}^{m,n}(i,j)$ is an element of an i-th row and a j-th column in the matrix $H_{MN}^{m,n}$, and $G_{MN}(i,j)$ is an element of an i-th row and a j-th column in the matrix $G_{MN}$;

defining a first correlation function:

$$R_{(m,n)} = \frac{\sum_{i=1}^{M}\sum_{j=1}^{N}[H_{MN}^{m,n}(i,j)\cdot G_{MN}(i,j)]}{\sum_{i=1}^{M}\sum_{j=1}^{N}[H_{MN}^{m,n}(i,j)]^2};$$

calculating numerical values of m and n when the first correlation function $R_{(m,n)}$ is closest to 1, and obtaining the M*N sub-matrix $H_{MN}^{m,n}$ matching the first reference sub-matrix according to the numerical values of m and n.

4. The dummy substrate detection method according to claim 2, wherein, the performing error analysis between the first real-time sub-matrix and the first reference sub-matrix, and determining whether or not there is the dummy substrate on the conveying route according to the error analysis result, includes:

defining a first single pixel absolute error:

$$\varepsilon^1(i,j) = |\{H_{MN}^{m,n}(i,j) - \overline{H}\} - \{G_{MN}(i,j) - \overline{G}\}|;$$

where $$\overline{H} = \frac{1}{M\cdot N}\sum_{i=1}^{M}\sum_{j=1}^{N}H_{MN}^{m,n}(i,j),\ \overline{G} = \frac{1}{M\cdot N}\sum_{i=1}^{M}\sum_{j=1}^{N}G_{MN}(i,j);$$

defining a first objective function, $$E_1 = \sum_{i=1}^{M}\sum_{j=1}^{N}\varepsilon^1(i,j);$$

setting a first objective function threshold $K^1$, and comparing the first objective function with the first objective function threshold $K^1$;

determining that there is the dummy substrate on the conveying route, if the first objective function is greater than the first objective function threshold $K^1$;

determining that there is no dummy substrate on the conveying route, if the first objective function is not greater than the first objective function threshold $K^1$.

5. The dummy substrate detection method according to claim 1, further comprising:

acquiring a real-time image during a process of the cut substrate passing through the conveying route;

matching and comparing the acquired real-time image during the process of the cut substrate passing through the conveying route with a second reference image, and determining whether or not there is the dummy substrate on the cut substrate according to a comparison result; wherein, the second reference image is an image during a process of the cut substrate with no dummy substrate passing through the conveying route.

6. The dummy substrate detection method according to claim 5, wherein, the matching and comparing the acquired real-time image during the process of the cut substrate passing through the conveying route with the second reference image, and determining whether or not there is the dummy substrate on the cut substrate according to the comparison result, includes steps of:

performing grayscale processing on the second reference image, to generate a pixel grayscale value matrix of the second reference image:

$$G_{xy}^2 = \begin{bmatrix} G^2(1,1) & G^2(1,2) & \ldots & G^2(1,y) \\ G^2(2,1) & G^2(2,2) & \ldots & G^2(2,y) \\ \ldots & \ldots & \ldots & \ldots \\ G^2(x,1) & G^2(x,2) & \ldots & G^2(x,y) \end{bmatrix}$$

where, x and y are respectively a row number and a column number of a pixel in the second reference image; and $G^2(x,y)$ is a grayscale value of the pixel in an x-th row and a y-th column in the second reference image;

defining the acquired real-time image during the cut substrate passing through the conveying route as a second real-time image, and performing grayscale processing on the second real-time image, to generate a pixel grayscale value matrix of the second real-time image:

$$H_{xy}^2 = \begin{bmatrix} H^2(1,1) & H^2(1,2) & \ldots & H^2(1,y) \\ H^2(2,1) & H^2(2,2) & \ldots & H^2(2,y) \\ \ldots & \ldots & \ldots & \ldots \\ H^2(x,1) & H^2(x,2) & \ldots & H^2(x,y) \end{bmatrix}$$

where, x and y are respectively a row number and a column number of a pixel in the second real-time image; and $H^2(x,y)$ is a grayscale value of the pixel in an x-th row and a y-th column in the second real-time image;

intercepting an E*F sub-matrix $G_{EF}$ from the pixel grayscale value matrix of the second reference image, and defining the sub-matrix as a second reference sub-matrix;

obtaining an E*F sub-matrix matching the second reference sub-matrix from the pixel grayscale value matrix of the second real-time image, and defining the sub-matrix as a second real-time sub-matrix;

performing error analysis between the second real-time sub-matrix and the second reference sub-matrix, and determining whether or not there is the dummy substrate on the cut substrate according to an error analysis result.

7. The dummy substrate detection method according to claim 6, wherein, the obtaining the E*F sub-matrix matching the second reference sub-matrix from the pixel grayscale value matrix of the second real-time image, includes:

setting an E*F sub-matrix $H_{EF}^{e,f}$ intercepted with an e-th row and an f-th column as starting position from the pixel grayscale value matrix of the second real-time image as the E*F sub-matrix matching the second reference sub-matrix, where, $1 \leq e+E \leq x$, $1 \leq f+F \leq y$;

defining a second matching function:

$$D_{(e,f)} = \sum_{i=1}^{E}\sum_{j=1}^{F}[H_{EF}^{e,f}(i,j)]^2 - 2\sum_{i=1}^{E}\sum_{j=1}^{F}[H_{EF}^{e,f}(i,j) \cdot G_{EF}(i,j)] + \sum_{i=1}^{E}\sum_{j=1}^{F}[G_{EF}(i,j)]^2;$$

where, $H_{EF}^{e,f}(i,j)$ is an element of an i-th row and a j-th column in the matrix $H_{EF}^{e,f}$, and $G_{EF}(i,j)$ is an element of an i-th row and a j-th column in the matrix $G_{EF}$;
defining a second correlation function:

$$R_{(e,f)} = \frac{\sum_{i=1}^{E}\sum_{j=1}^{F}[H_{EF}^{e,f}(i,j) \cdot G_{EF}(i,j)]}{\sum_{i=1}^{E}\sum_{j=1}^{F}[H_{EF}^{e,f}(i,j)]^2};$$

calculating numerical values of e and f when the second correlation function $R_{(e,f)}$ is closest to 1, and obtaining the E*F sub-matrix $H_{EF}^{e,f}$ matching the second reference sub-matrix, according to the numerical values of e and f.

8. The dummy substrate detection method according to claim 6, wherein, the performing error analysis between the second real-time sub-matrix and the second reference sub-matrix, and determining whether or not there is the dummy substrate on the cut substrate according to the error analysis result, includes:
defining a second single pixel absolute error:

$$\varepsilon^2(i,j) = |\{H_{EF}^{e,f}(i,j) - \overline{H}\} - \{G_{EF}(i,j) - \overline{G}\}|;$$

where, $$\overline{H} = \frac{1}{E \cdot F}\sum_{i=1}^{E}\sum_{j=1}^{F}H_{EF}^{e,f}(i,j); \overline{G} = \frac{1}{E \cdot F}\sum_{i=1}^{E}\sum_{j=1}^{F}G_{EF}(i,j);$$

defining a second objective function, $$E_2 = \sum_{i=1}^{E}\sum_{j=1}^{F}\varepsilon^2(i,j);$$

setting a second objective function threshold $K^2$, and comparing the second objective function with the second objective function threshold $K^2$;
determining that there is the dummy substrate on the cut substrate, if the second objective function is greater than the second objective function threshold $K^2$;
determining that there is no dummy substrate on the cut substrate, if the second objective function is not greater than the second objective function threshold $K^2$.

9. A dummy substrate detector device, comprising:
an image acquisition component, configured to acquire a real-time image of a conveying route when a cut substrate enters the conveying route, and save the image as a first real-time image;
an image processing component, configured to match and compare the first real-time image with a first reference image, and determine whether or not there is a dummy substrate on the conveying route according to a comparison result; wherein, the first reference image is an image of the conveying route with no dummy substrate.

10. The dummy substrate detector device according to claim 9, wherein, the image processing component includes:
a matrix processor element, configured to:
perform grayscale processing on the first reference image, to generate a pixel grayscale value matrix of the first reference image:

$$G_{xy}^1 = \begin{bmatrix} G^1(1,1) & G^1(1,2) & \dots & G^1(1,y) \\ G^1(2,1) & G^1(2,2) & \dots & G^1(2,y) \\ \dots & \dots & \dots & \dots \\ G^1(x,1) & G^1(x,2) & \dots & G^1(x,y) \end{bmatrix}$$

where, x and y are respectively a row number and a column number of a pixel in the first reference image; and $G^1(x,y)$ is a grayscale value of the pixel in an x-th row and a y-th column in the first reference image;
perform grayscale processing on the first real-time image, to generate a pixel grayscale value matrix of the first real-time image:

$$H_{xy}^1 = \begin{bmatrix} H^1(1,1) & H^1(1,2) & \dots & H^1(1,y) \\ H^1(2,1) & H^1(2,2) & \dots & H^1(2,y) \\ \dots & \dots & \dots & \dots \\ H^1(x,1) & H^1(x,2) & \dots & H^1(x,y) \end{bmatrix}$$

where, x and y are respectively a row number and a column number of a pixel in the first real-time image; and $H^1(x,y)$ is a grayscale value of the pixel located in an x-th row and a y-th column in the first real-time image;
a matrix matcher element, configured to:
intercept an M*N sub-matrix $G_{MN}$ from the pixel grayscale value matrix of the first reference image, and define the sub-matrix as a first reference sub-matrix;
obtain an M*N sub-matrix matching the first reference sub-matrix from the pixel grayscale value matrix of the first real-time image, and define the sub-matrix as a first real-time sub-matrix;
an analyzer element, configured to:
perform error analysis between the first real-time sub-matrix and the first reference sub-matrix, and determine whether or not there is the dummy substrate on the conveying route according to an error analysis result.

11. The dummy substrate detector device according to claim 10, wherein,
the matrix matcher element is configured to:
set an M*N sub-matrix $H_{MN}^{m,n}$ intercepted with an m-th row and an n-th column as starting position from the pixel grayscale value matrix of the first real-time image as the M*N sub-matrix matching the first reference sub-matrix $G_{MN}$, where, $1 \leq m+M \leq x$, $1 \leq n+N \leq y$;
define a first matching function:

$$D_{(m,n)} = \sum_{i=1}^{M}\sum_{j=1}^{N}[H_{MN}^{mn}(i,j)]^2 -$$

-continued $$2\sum_{i=1}^{M}\sum_{j=1}^{N}[H_{MN}^{m,n}(i,j)\cdot G_{MN}(i,j)]+\sum_{i=1}^{M}\sum_{j=1}^{N}[G_{MN}(i,j)]^2;$$

where, $H_{MN}^{m,n}(i,j)$ is an element of an i-th row and a j-th column in the matrix $H_{MN}^{m,n}$, and $G_{MN}(i,j)$ is an element of an i-th row and a j-th column in the matrix $G_{MN}$;

define a first correlation function:

$$R_{(m,n)} = \frac{\sum_{i=1}^{M}\sum_{j=1}^{N}[H_{MN}^{m,n}(i,j)\cdot G_{MN}(i,j)]}{\sum_{i=1}^{M}\sum_{j=1}^{N}[H_{MN}^{m,n}(i,j)]^2};$$

calculate numerical values of m and n when the first correlation function $R_{(m,n)}$ is closest to 1, and obtain the M*N sub-matrix $H_{MN}^{m,n}$ matching the first reference sub-matrix according to the numerical values of m and n;

the analyzer element, configured to:

define a first single pixel absolute error:

$$\varepsilon^1(i,j)=|\{H_{MN}^{m,n}(i,j)-\overline{H}\}-\{G_{MN}(i,j)-\overline{G}\}|;$$

where, $$\overline{H} = \frac{1}{M\cdot N}\sum_{i=1}^{M}\sum_{j=1}^{N}H_{MN}^{m,n}(i,j),$$

$$\overline{G} = \frac{1}{M\cdot N}\sum_{i=1}^{M}\sum_{j=1}^{N}G_{MN}(i,j);$$

define a first objective function, $$E_1 = \sum_{i=1}^{M}\sum_{j=1}^{N}\varepsilon^1(i,j);$$

set a first objective function threshold $K^1$, and compare the first objective function with the first objective function threshold $K^1$;

determine that there is the dummy substrate on the conveying route, if the first objective function is greater than the first objective function threshold $K^1$;

determine that there is no dummy substrate on the conveying route, if the first objective function is not greater than the first objective function threshold $K^1$.

13. The dummy substrate detector device according to claim 9, wherein, the image acquisition component is further configured to acquire a real-time image during a process of the cut substrate passing through the conveying route, and save the image as a second real-time image;

the image processing component is further configured to match and compare the second real-time image with a second reference image, and determine whether or not there is the dummy substrate on the cut substrate according to a comparison result; wherein, the second reference image is an image during the process of the cut substrate with no dummy substrate passing through the conveying route.

13. The dummy substrate detector device according to claim 12, wherein, in the image processing component, the matrix processor element, is further configured to:

perform grayscale processing on the second reference image, to generate a pixel grayscale value matrix of the second reference image:

$$G_{xy}^2 = \begin{bmatrix} G^2(1,1) & G^2(1,2) & \ldots & G^2(1,y) \\ G^2(2,1) & G^2(2,2) & \ldots & G^2(2,y) \\ \ldots & \ldots & \ldots & \ldots \\ G^2(x,1) & G^2(x,2) & \ldots & G^2(x,y) \end{bmatrix}$$

where, x and y are respectively a row number and a column number of a pixel in the second reference image; and $G^2(x,y)$ is a grayscale value of the pixel in an x-th row and a y-th column in the second reference image;

perform grayscale processing on the second real-time image, to generate a pixel grayscale value matrix of the second real-time image:

$$H_{xy}^2 = \begin{bmatrix} H^2(1,1) & H^2(1,2) & \ldots & H^2(1,y) \\ H^2(2,1) & H^2(2,2) & \ldots & H^2(2,y) \\ \ldots & \ldots & \ldots & \ldots \\ H^2(x,1) & H^2(x,2) & \ldots & H^2(x,y) \end{bmatrix}$$

where, x and y are respectively a row number and a column number of a pixel in the second real-time image; and $H^2(x,y)$ is a grayscale value of the pixel in an x-th row and a y-th column in the second real-time image;

the matrix matcher element is further configured to:

intercept an E*F sub-matrix $G_{EF}$ from the pixel grayscale value matrix of the second reference image; and define the sub-matrix as a second reference sub-matrix;

obtain an E*F sub-matrix matching the second reference sub-matrix from the pixel grayscale value matrix of the second real-time image, and define the sub-matrix as a second real-time sub-matrix;

the analyzer element is further configured to:

perform error analysis between the second real-time sub-matrix and the second reference sub-matrix, and determine whether or not there is the dummy substrate on the cut substrate according to an error analysis result.

14. The dummy substrate detector device according to claim 13, wherein, the matrix matcher element is configured to:

set the E*F sub-matrix $H_{G_{EF}}^{e,f}$ intercepted with an e-th row and an f-th column as starting position from the pixel grayscale value matrix of the second real-time image as the E*F sub-matrix matching the second reference sub-matrix $G_{EF}$, where, $1 \leq e+E \leq x$, $1 \leq f+F \leq y$;

define a second matching function:

$$D_{(e,f)} = \sum_{i=1}^{E}\sum_{j=1}^{F}[H_{EF}^{e,f}(i,j)]^2 -$$

-continued $$2\sum_{i=1}^{E}\sum_{j=1}^{F}\left[H_{EF}^{e,f}(i,j)\cdot G_{EF}(i,j)\right]+\sum_{i=1}^{E}\sum_{j=1}^{F}\left[G_{EF}(i,j)\right]^2;$$

where, $H_{EF}^{e,f}(i,j)$ is an element of an i-th row and a j-th column in the matrix $H_{EF}^{e,f}$, and $G_{EF}(i,j)$ is an element of an i-th row and a j-th column in the matrix $G_{EF}$;

define a second correlation function:

$$R_{(e,f)} = \frac{\sum_{i=1}^{E}\sum_{j=1}^{F}\left[H_{EF}^{e,f}(i,j)\cdot G_{EF}(i,j)\right]}{\sum_{i=1}^{E}\sum_{j=1}^{F}\left[H_{EF}^{e,f}(i,j)\right]^2};$$

calculate numerical values of e and f when the second correlation function $R_{(e,f)}$ is closest to 1, and obtain the E*F sub-matrix $H_{EF}^{e,f}$ matching the second reference sub-matrix, according to the numerical values of e and f;

the analyzer element is configured to:
define a second single pixel absolute error:

$$\varepsilon^2(i,j)=|\{H_{EF}^{e,f}(i,j)-\overline{H}\}-\{G_{EF}(i,j)-\overline{G}\}|;$$

where, $$H = \frac{1}{E\cdot F}\sum_{i=1}^{E}\sum_{j=1}^{F}H_{EF}^{e,f}(i,j);$$

$$G = \frac{1}{E\cdot F}\sum_{i=1}^{E}\sum_{j=1}^{F}G_{EF}(i,j);$$

define a second objective function, $$E_2 = \sum_{i=1}^{E}\sum_{j=1}^{F}\varepsilon^2(i,j);$$

set a second objective function threshold $K^2$, and compare the second objective function with the second objective function threshold $K^2$;

determine that there is the dummy substrate on the cut substrate, if the second objective function is greater than the second objective function threshold $K^2$;

determine that there is no dummy substrate on the cut substrate, if the second objective function is not greater than the second objective function threshold $K^2$.

15. A dummy substrate detector system, comprising the dummy substrate detector device according to claim 12, and, a conveyor device, configured to convey the cut substrate through the conveying route;
a driver device, configured to drive the conveyor device to move;
a first sensor, at a starting end of the conveying route, configured to sense the cut substrate and generate a first sensing signal;
a main controller device, in signal connection with the image acquisition component, the image processing component, the driver device and the first sensor, configured to:

control the driver device to stop driving the conveyor device, when receiving the first sensing signal of the first sensor, and control the image acquisition component to acquire the real-time image of the conveying route; and, control the driver device to drive the conveyor device to continue to move, in a case where the image processing component determines that there is no dummy substrate on the conveying route.

16. The dummy substrate detector system according to claim 15, further comprising:
a second sensor in signal connection with the main controller device, wherein, the second sensor is in the conveying route, and is configured to sense the cut substrate and generate a sensing signal;
the main controller device, further configured to:
control the image acquisition component to acquire the real-time image during the process of the cut substrate sensed by the second sensor passing through the conveying route, when receiving the second sensing signal of the second sensor; and
generate an alarm signal, in a case where the image processing component determines that there is the dummy substrate on the cut substrate.

17. The dummy substrate detector system according to claim 15, wherein, the image acquisition component includes a one-dimensional linear image sensor and a servo driver configured to drive the one-dimensional linear image sensor to move so as to obtain an image.

18. The dummy substrate detection method according to claim 7, wherein, the performing error analysis between the second real-time sub-matrix and the second reference sub-matrix, and determining whether or not there is the dummy substrate on the cut substrate according to the error analysis result, includes:
defining a second single pixel absolute error:

$$\varepsilon^2(i,j)=|\{H_{EF}^{e,f}(i,j)-\overline{H}\}-\{G_{EF}(i,j)-\overline{G}\}|;$$

where, $$H = \frac{1}{E\cdot F}\sum_{i=1}^{E}\sum_{j=1}^{F}H_{EF}^{e,f}(i,j);$$

$$G = \frac{1}{E\cdot F}\sum_{i=1}^{E}\sum_{j=1}^{F}G_{EF}(i,j);$$

defining a second objective function, $$E_2 = \sum_{i=1}^{E}\sum_{j=1}^{F}\varepsilon^2(i,j);$$

setting a second objective function threshold $K^2$, and comparing the second objective function with the second objective function threshold $K^2$;

determining that there is the dummy substrate on the cut substrate, if the second objective function is greater than the second objective function threshold $K^2$;

determining that there is no dummy substrate on the cut substrate, if the second objective function is not greater than the second objective function threshold $K^2$.

19. The dummy substrate detector system according to claim 16, wherein, the image acquisition component includes a one-dimensional linear image sensor and a servo driver configured to drive the one-dimensional linear image sensor to move so as to obtain an image.

\* \* \* \* \*